US011673658B2

(12) United States Patent
Jordan

(10) Patent No.: US 11,673,658 B2
(45) Date of Patent: Jun. 13, 2023

(54) ROTOR ASSEMBLIES FOR SCISSORING PROPELLER

(71) Applicant: Aurora Flight Sciences Corporation, Manassas, VA (US)

(72) Inventor: Jeffrey Scott Jordan, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 16 days.

(21) Appl. No.: 17/463,229

(22) Filed: Aug. 31, 2021

(65) Prior Publication Data

US 2022/0111956 A1     Apr. 14, 2022

Related U.S. Application Data

(60) Provisional application No. 63/079,071, filed on Sep. 16, 2020.

(51) Int. Cl.
| | |
|---|---|
| *B64C 27/473* | (2006.01) |
| *B64C 27/30* | (2006.01) |
| *B64C 29/00* | (2006.01) |
| *B64C 27/50* | (2006.01) |

(52) U.S. Cl.
CPC ............ *B64C 27/30* (2013.01); *B64C 27/473* (2013.01); *B64C 27/50* (2013.01); *B64C 29/0016* (2013.01)

(58) Field of Classification Search
None
See application file for complete search history.

(56) References Cited

U.S. PATENT DOCUMENTS 10,494,088 B1 * 12/2019 Coralic .................. B64C 27/82

* cited by examiner

*Primary Examiner* — Juan G Flores
(74) *Attorney, Agent, or Firm* — Michael Stanley Tomsa; McAndrews, Held & Malloy, Ltd.; Amanda C. Jackson

(57) ABSTRACT

A hub assembly having a first hub subassembly, a second hub subassembly, and a rotary guide. The first hub subassembly rotates a first blade assembly about an axis of rotation in a first plane. The second hub subassembly rotates a second blade assembly about the axis of rotation in a second plane. The rotary guide controls an axial position of the second hub subassembly relative to the first hub subassembly about the axis of rotation. The rotary guide is configured to adjust the axial position as a function of a lifting force generated by the first blade assembly or the second blade assembly.

20 Claims, 15 Drawing Sheets

VTOL Operation
(Deployed Configuration)

Cruise Operation
(Stowed Configuration)

VTOL Operation
(Deployed Configuration)

Cruise Operation
(Stowed Configuration)

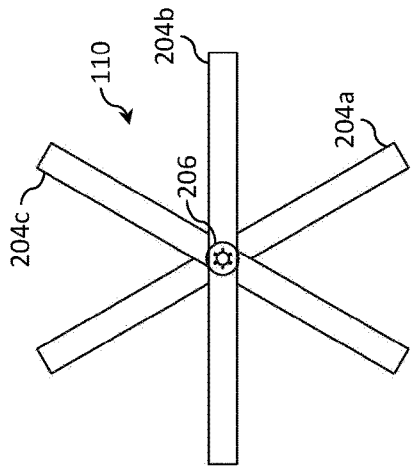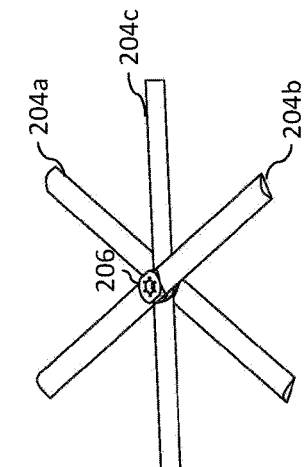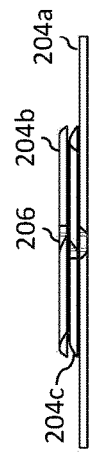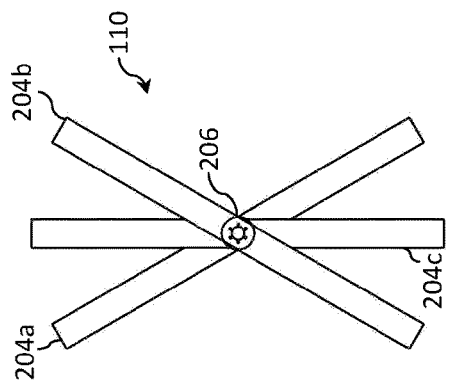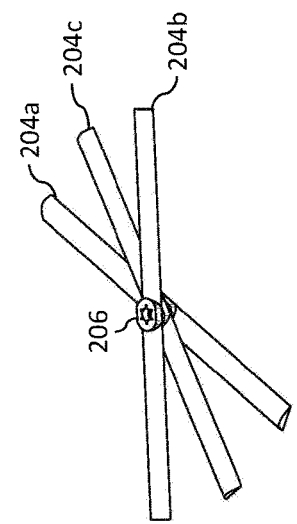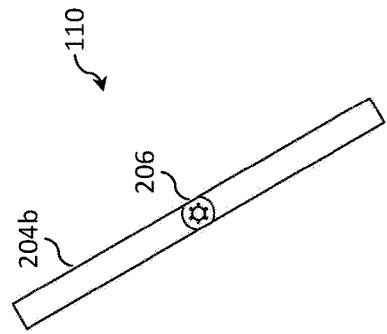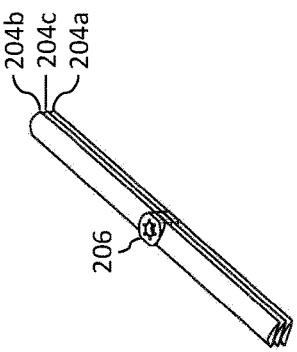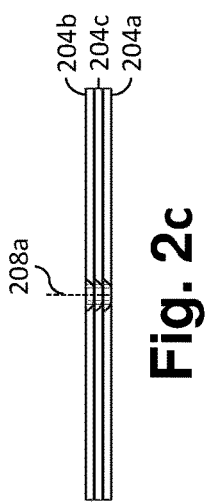

Stowed Configuration

Deployed Configuration

Stowed Configuration

Deployed Configuration

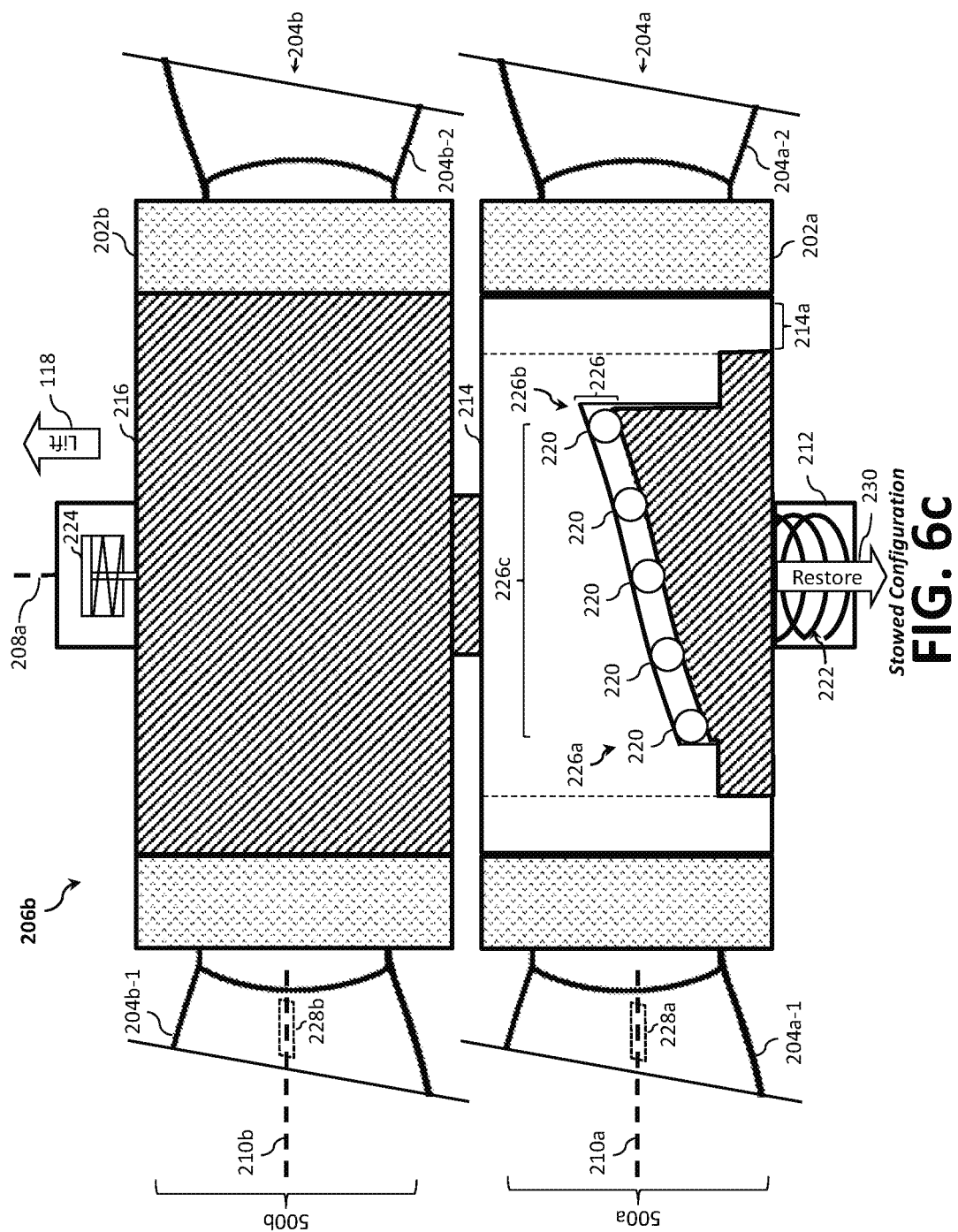

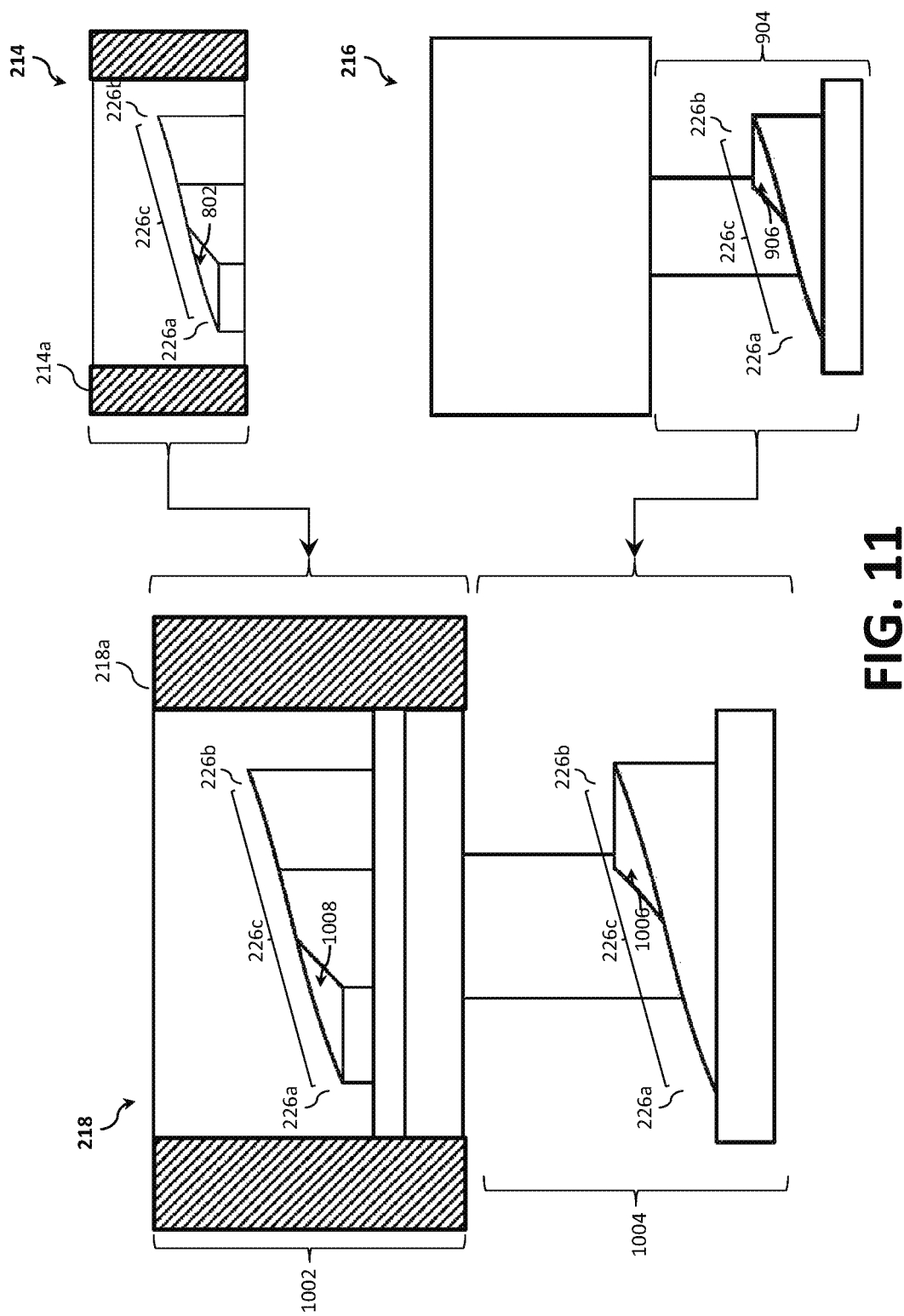

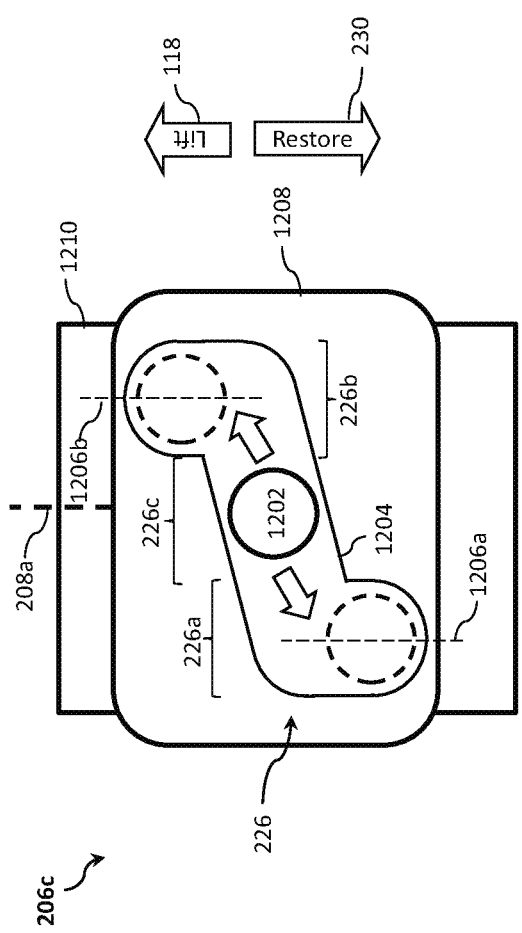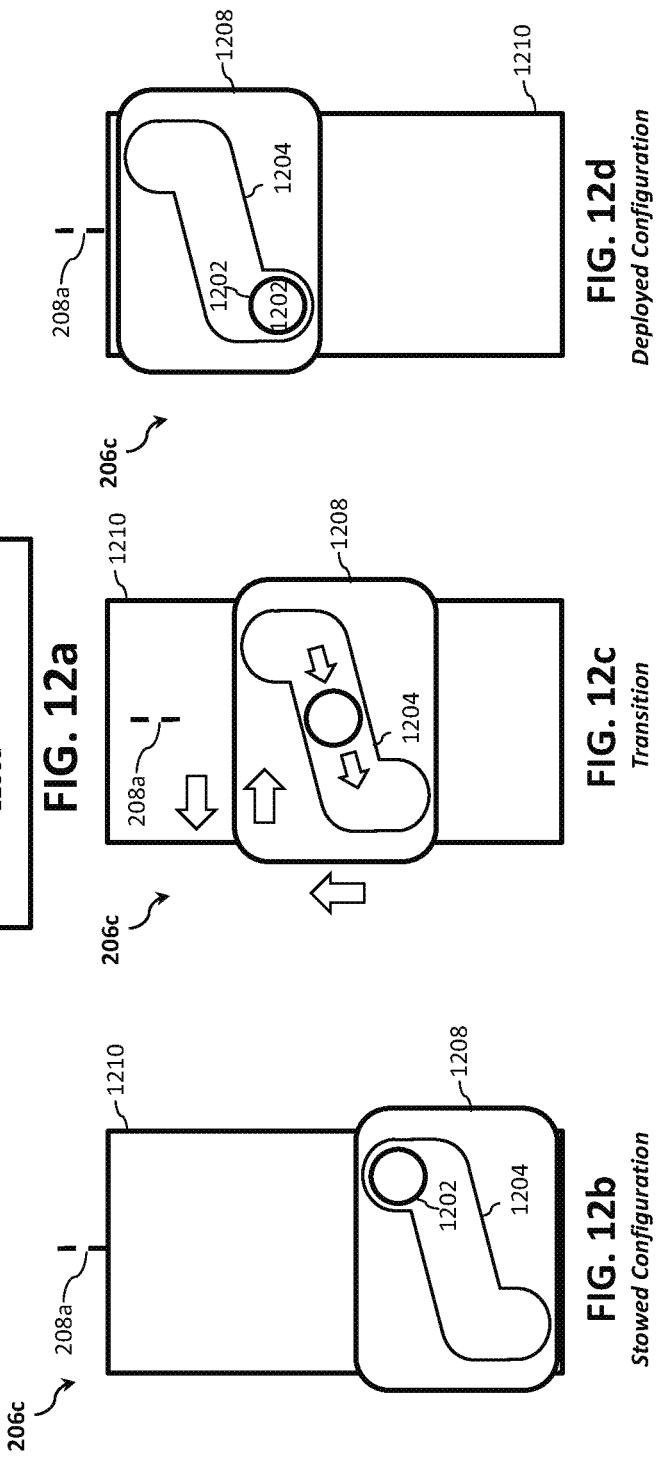

ROTOR ASSEMBLIES FOR SCISSORING PROPELLER

RELATED APPLICATION

The present application claims priority to U.S. Provisional Patent Application No. 63/079,071, filed Sep. 16, 2020, and entitled "Rotor Assemblies for Scissoring Propeller" which is hereby incorporated by reference in its entirety.

FIELD

The present disclosure is directed to rotor assemblies for scissoring rotors, aircraft including the same, and associated methods.

BACKGROUND

There has long been a need for vertical take-off-and-landing (VTOL) aircraft that are capable of being deployed from confined spaces. The ability to deploy a VTOL aircraft is particularly attractive in situations where a runway is unavailable or inaccessible. VTOL aircraft, such as rotorcraft, utilize rotors to generate a vertical thrust for lifting the aircraft during VTOL operation, which are used primarily during take-off, hover, and landing phases of flight (and/or for other altitude adjustments to the aircraft). The VTOL aircraft can further includes a forward thrust generator for propelling the aircraft forward during cruise phases of flight, such as a propeller.

VTOL aircraft with rotor assemblies having blades of a fixed pitch and a fixed plane of rotation experience heavy bending moments as the aircraft transitions between VTOL operation and cruise operation. These heavy bending moments can be attributed to additional lift being created on one side of the hub as compared to the other side of the hub. The differences in lift is a function of the forward speed of the aircraft and the rotational velocity of the rotor blades. For example, as the rotor is driven, one side of the rotor is exposed to high-speed forward airflow (rotational velocity plus forward velocity) creating lift, while the other side of the rotor is exposed less lift (rotational velocity minus forward velocity).

As the rotor rotates, each rotor blade oscillates through the low and high lift to yield the oscillating bending moments. This oscillation decreases efficiency and typically requires more infrastructure to overcome the large resultant fatigue loads. Additional rotor blades and slower rotational speeds, for example, can help to decrease the bending moments; however, this also increases drag during cruise operation. Variable pitch rotors can also assist in this efficiency; however, variable pitch mechanisms increase weight, complication, and cost of the aircraft. Therefore, it is desirable to both reduce drag during cruise operation and maintain lift efficiency during VTOL operation, yet reduce the oscillating bending moments. The present disclosure addresses this need.

SUMMARY

The present disclosure provides rotor assemblies for scissoring propeller, aircraft including the same, and associated methods.

According to a first aspect, a method of operating a hub assembly of an aircraft comprises: controlling the hub assembly to generate a lifting force via a first blade assembly and a second blade assembly, wherein the hub assembly includes a first hub subassembly configured to rotate the first blade assembly about an axis of rotation in a first plane, and a second hub subassembly configured to rotate the second blade assembly about the axis of rotation in a second plane; and controlling an axial position of the first hub subassembly relative to the second hub subassembly about the axis of rotation via a rotary guide, wherein the rotary guide is configured to transition, as a function of the lifting force, the first blade assembly and the second blade assembly between (a) a stowed configuration where the first blade assembly and the second blade assembly are arranged at a first angle relative to one another and (b) a deployed configuration where the first blade assembly and the second blade assembly are arranged at a second angle relative to one another.

In certain aspects, the rotary guide comprises a first guide segment, a second guide segment, and a third guide segment that is positioned between the first guide segment and the second guide segment.

In certain aspects, the method further comprises the step of securing the second hub subassembly at (a) a first axial position corresponding to the stowed configuration via the first guide segment or (b) a second axial position corresponding to the deployed configuration via the second guide segment.

In certain aspects, the method further comprises the step of biasing the second hub subassembly toward the first hub subassembly via a restoring force from a first biasing mechanism to guide the second hub subassembly toward the second axial position via the rotary guide.

In certain aspects, the method further comprises the step of generating a lifting force during a hover phase of the aircraft that is greater than the restoring force of the first biasing mechanism, wherein biasing the second hub subassembly away from the first hub subassembly via the lifting force guides the second hub subassembly toward the second axial position.

In certain aspects, the method further comprises the step of transitioning the aircraft from the hover phase to a cruise phase, wherein the restoring force guides the second hub subassembly back to the first axial position in an absence of the lifting force.

According to a second aspect, a hub assembly comprises: a first hub subassembly configured to rotate a first blade assembly about an axis of rotation in a first plane; a second hub subassembly configured to rotate a second blade assembly about the axis of rotation in a second plane; and a rotary guide configured to control an axial position of the second hub subassembly relative to the first hub subassembly about the axis of rotation, wherein the rotary guide is configured to adjust the axial position as a function of a lifting force generated by the first blade assembly or the second blade assembly.

In certain aspects, the rotary guide comprises a first guide segment, a second guide segment, and a third guide segment that is positioned between the first guide segment and the second guide segment.

In certain aspects, the first guide segment is configured to secure the second hub subassembly at a first axial position relative to the first hub subassembly and the second guide segment is configured to secure the second hub subassembly at a second axial position relative to the first hub subassembly.

In certain aspects, the third guide segment is shaped to define a ramp between the first guide segment and the second guide segment.

In certain aspects, the ramp is shaped to control a rate at which the second hub subassembly moves between (a) the first axial position and (b) the second axial position.

In certain aspects, the lifting force urges the second blade assembly along the ramp from a stowed configuration to a deployed configuration.

In certain aspects, the hub assembly further comprises a first biasing mechanism that is configured to bias the second hub subassembly toward the first hub subassembly via a restoring force.

In certain aspects, the first biasing mechanism is a spring or a mechanical actuator.

In certain aspects, the hub assembly further comprises a second biasing mechanism configured to secure the axial position of the first hub subassembly relative to the second hub subassembly.

In certain aspects, the second biasing mechanism is a mechanical actuator.

In certain aspects, the rotary guide is employs a pin and slot arrangement.

In certain aspects, the hub assembly further comprises a third hub subassembly that shares the axis of rotation with the first hub subassembly and second hub subassembly, wherein the third hub subassembly is positioned between the first hub subassembly and second hub subassembly.

According to a third aspect, a hub assembly comprises: a first hub subassembly configured to rotate a first blade assembly about an axis of rotation in a first plane; a second hub subassembly configured to rotate a second blade assembly about the axis of rotation in a second plane; a third hub subassembly configured to rotate a third blade assembly about the axis of rotation in a third plane; and a first rotary guide configured to control an axial position of the third hub subassembly relative to the first hub subassembly about the axis of rotation configured to be driven with a lifting force generated by the second blade assembly or the third blade assembly; and a second rotary guide configured to control an axial position of the second hub subassembly relative to the third hub subassembly about the axis of rotation as a function of the lifting force.

In certain aspects, each of the first rotary guide and the second rotary guide comprises a first guide segment, a second guide segment, and a third guide segment that is positioned between the first guide segment and the second guide segment.

In certain aspects, the hub assembly further comprises a first biasing mechanism that is configured to bias both the second hub subassembly and the third hub subassembly toward the first hub subassembly via a restoring force.

In certain aspects, the first biasing mechanism is a spring.

In certain aspects, the hub assembly further comprises a second biasing mechanism configured to bias the second hub subassembly and the third hub subassembly in a direction that opposes the bias of the first biasing mechanism.

DRAWINGS

The foregoing and other objects, features, and advantages of the devices, systems, and methods described herein will be apparent from the following description of particular embodiments thereof, as illustrated in the accompanying figures; where like reference numbers refer to like structures. The figures are not necessarily to scale, emphasis instead being placed upon illustrating the principles of the devices, systems, and methods described herein.

FIGS. 2a, 2b, and 2c illustrate, respectively, top, perspective, and side views of a first rotor assembly in a stowed configuration.

FIGS. 3a, 3b, and 3c illustrate, respectively, top, perspective, and side views of the first rotor assembly in transition between the stowed configuration and a deployed configuration.

FIGS. 4a, 4b, and 4c illustrate, respectively, top, perspective, and side views of the first rotor assembly in the deployed configuration.

Figure 5A:
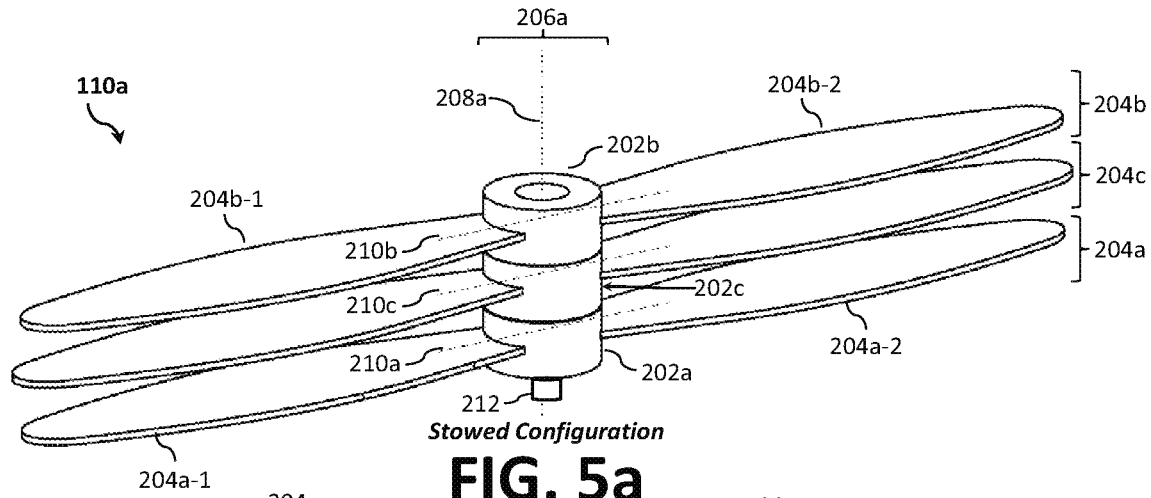

FIG. 5a illustrates a detailed perspective view of the first rotor assembly in the stowed configuration.

Figure 5B:
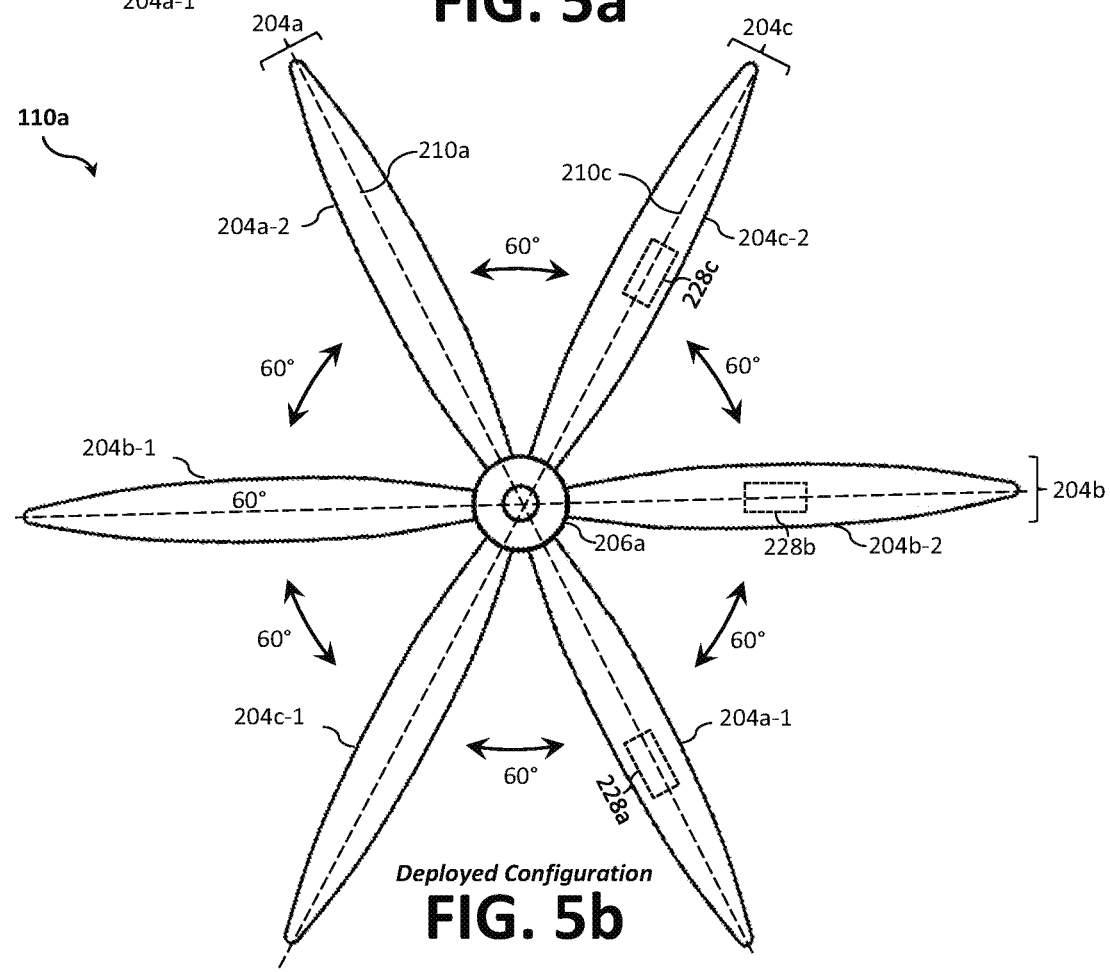

FIG. 5b illustrates a detailed top view of the first rotor assembly in the deployed configuration.

Figure 5C:
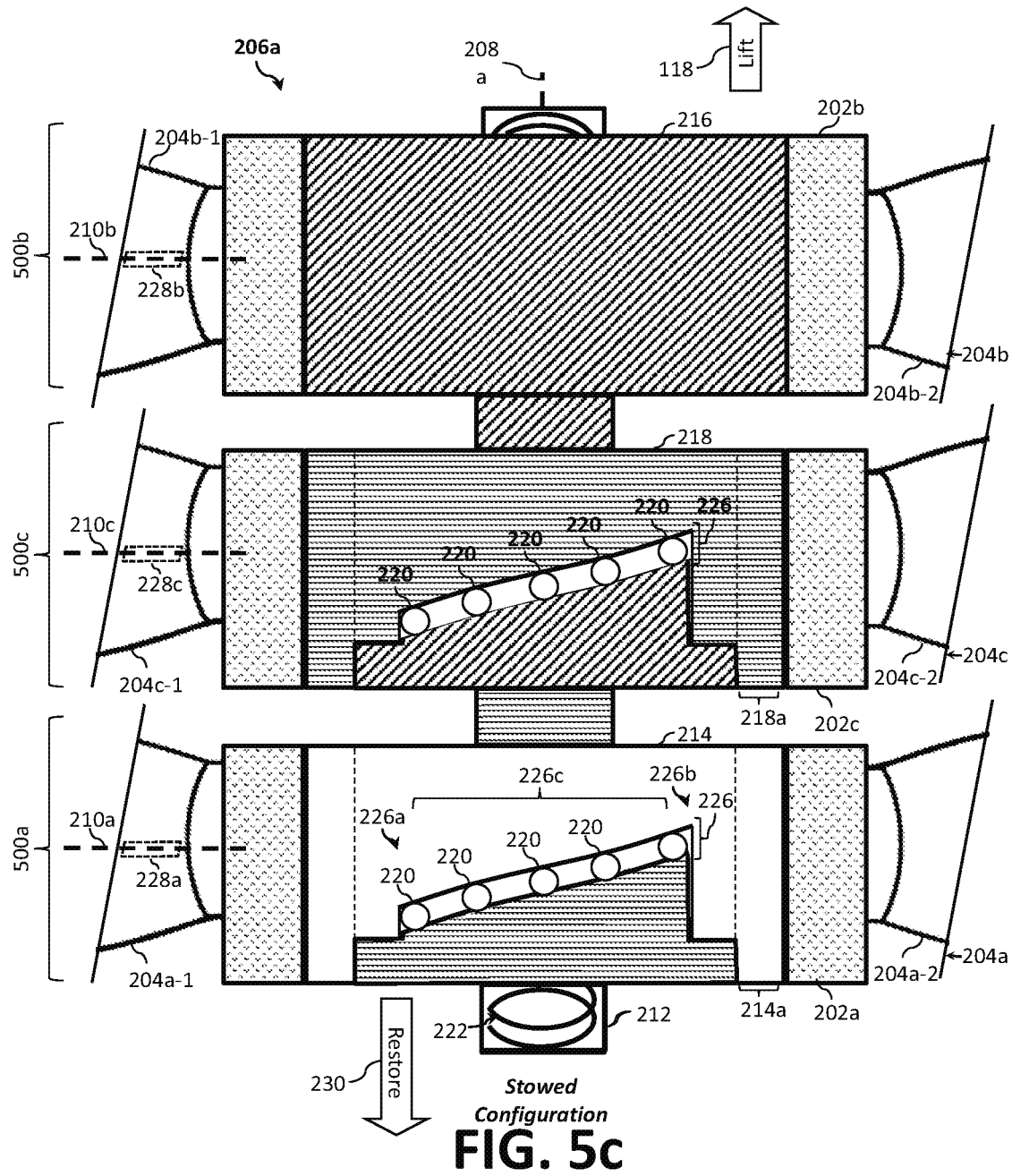

FIG. 5c illustrates a cut-away diagram of a hub assembly of the first rotor assembly in the stowed configuration.

Figure 6A:
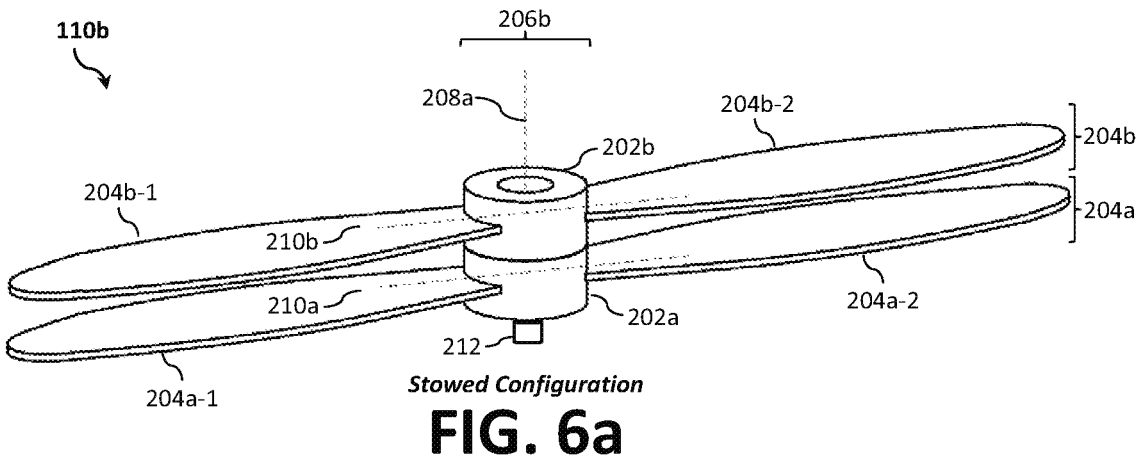

FIG. 6a illustrates a detailed perspective view of a second rotor assembly in a stowed configuration.

Figure 6B:
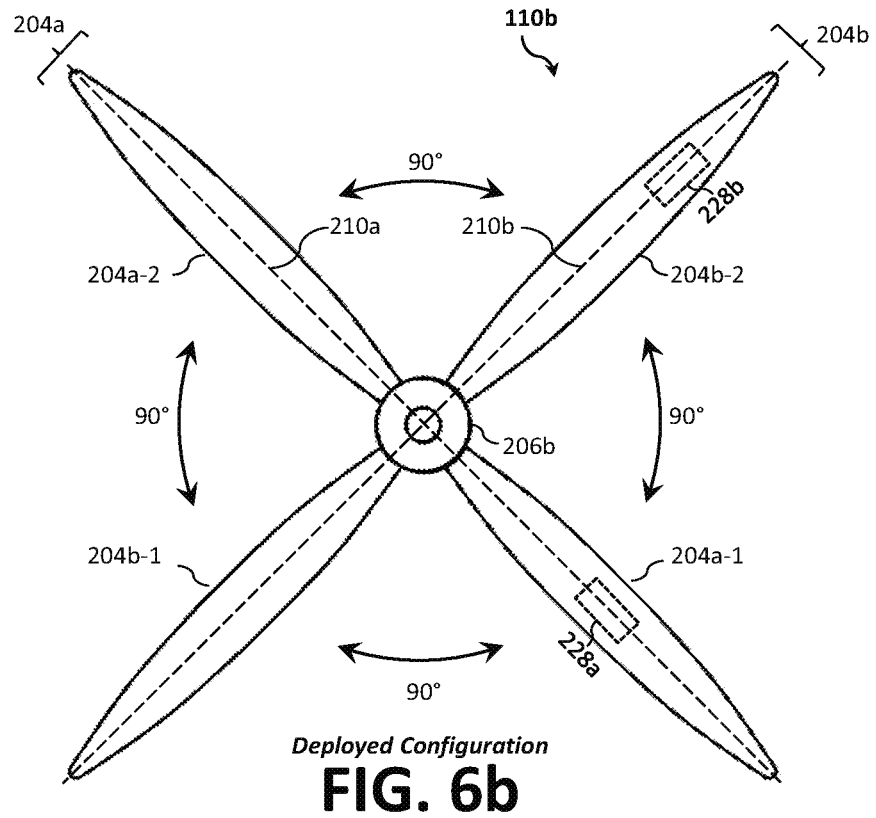

FIG. 6b illustrates a detailed top view of the second rotor assembly in a deployed configuration.

FIG. 6c illustrates a cut-away diagram of a hub assembly of the second rotor assembly in the stowed configuration.

Figure 7:
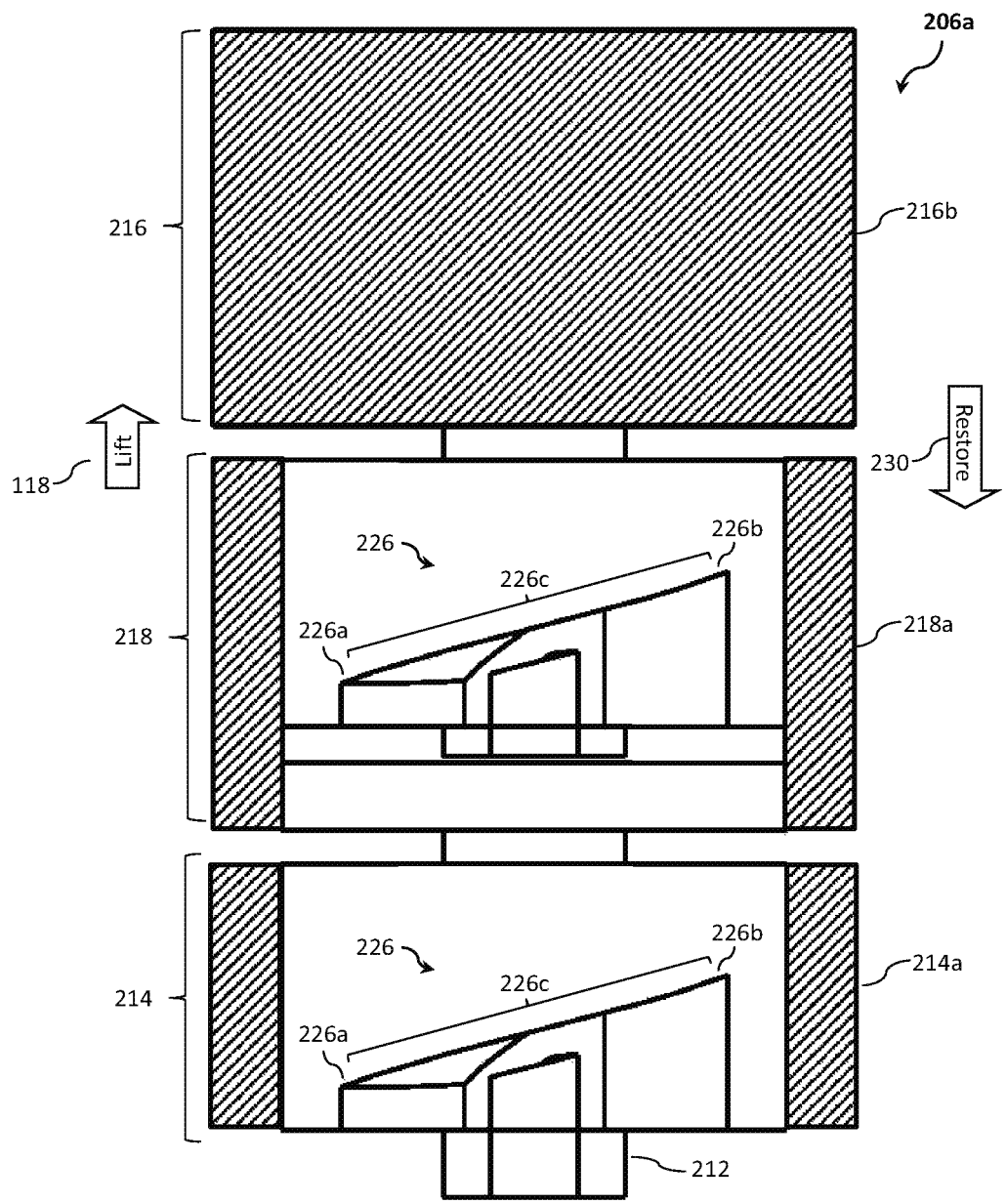

FIG. 7 illustrates a side view of an example hub assembly for use with the first rotor assembly.

Figure 8B:
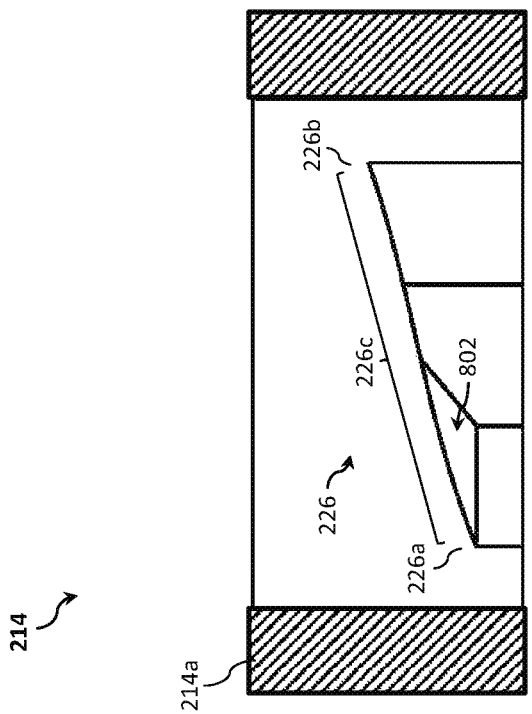
Figure 8A:
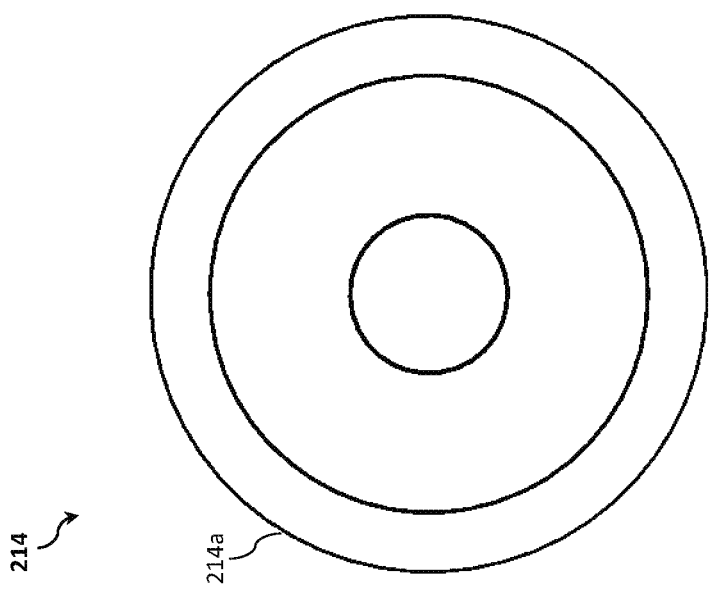

FIG. 8a illustrates a top view of the first hub subassembly of the hub assembly of FIG. 7.

FIG. 8b illustrates a side view of the first hub subassembly with the outer wall cut away.

Figure 9B:
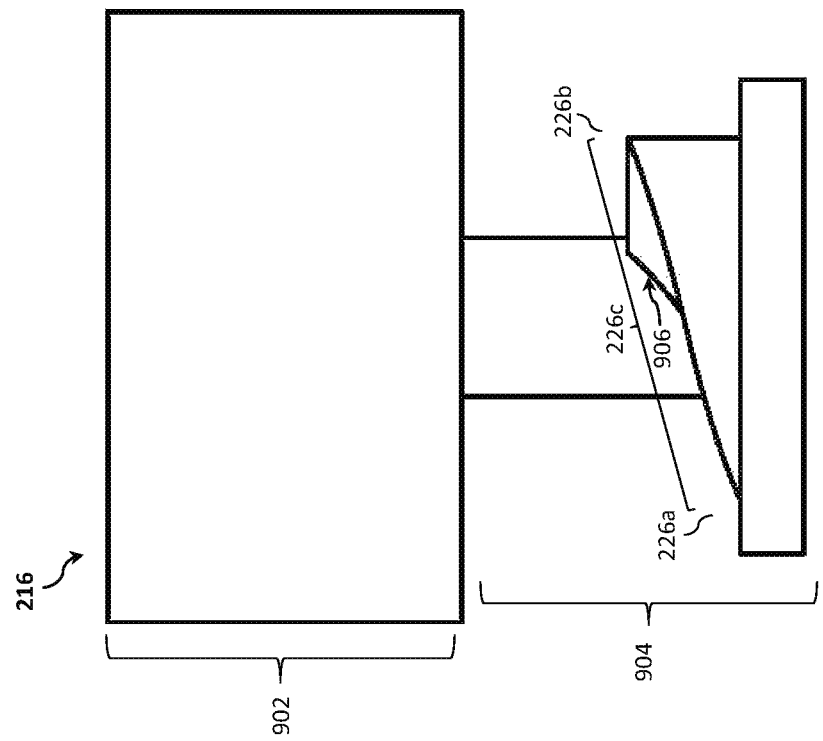
Figure 9A:
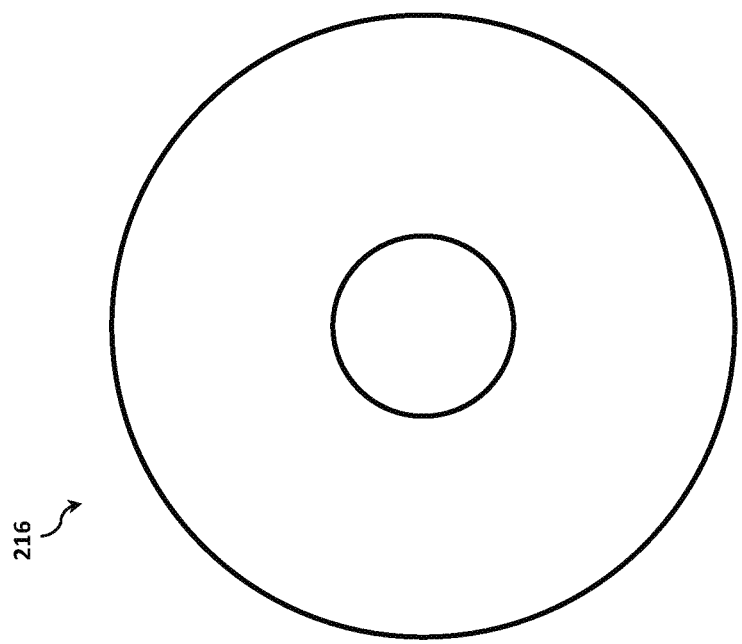

FIGS. 9a and 9b illustrate, respectively, top, and side views of the second hub subassembly of the hub assembly of FIG. 7.

Figure 10B:
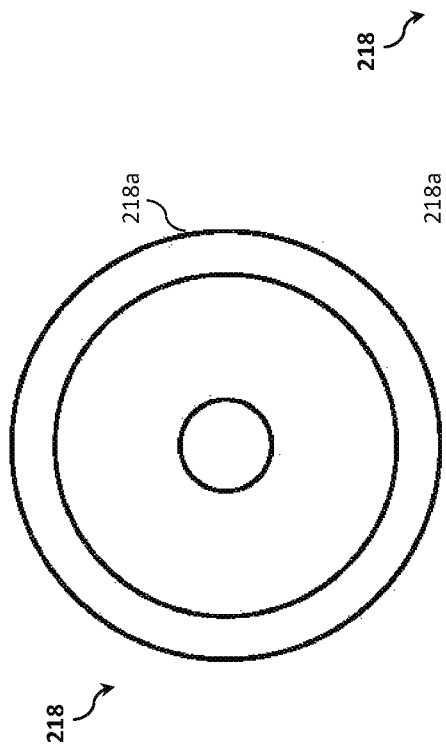
Figure 10C:
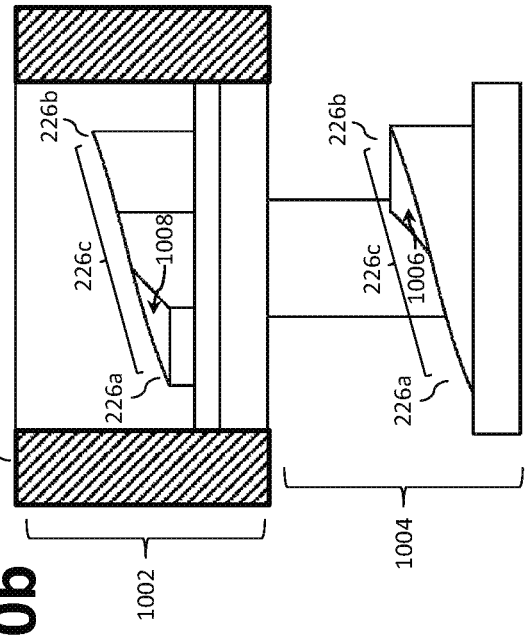
Figure 10A:
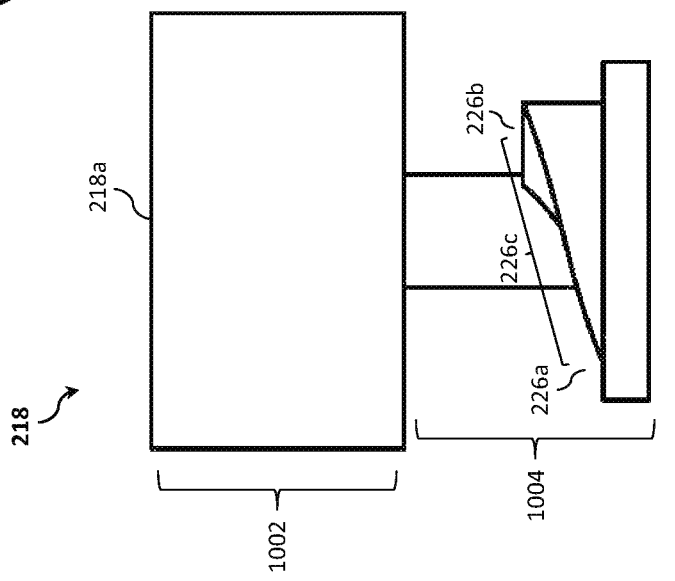

FIGS. 10a and 10b illustrate, respectively, top, and side views of the third hub subassembly of the hub assembly of FIG. 7.

FIG. 10c illustrates a side view of the third hub subassembly with the outer wall cut away.

FIG. 11 illustrates a side assembly diagram of the hub assembly.

FIGS. 12a through 12d illustrate a diagram of a third hub assembly in accordance with another example transitioning between stowed and deployed configurations.

Figure 13:
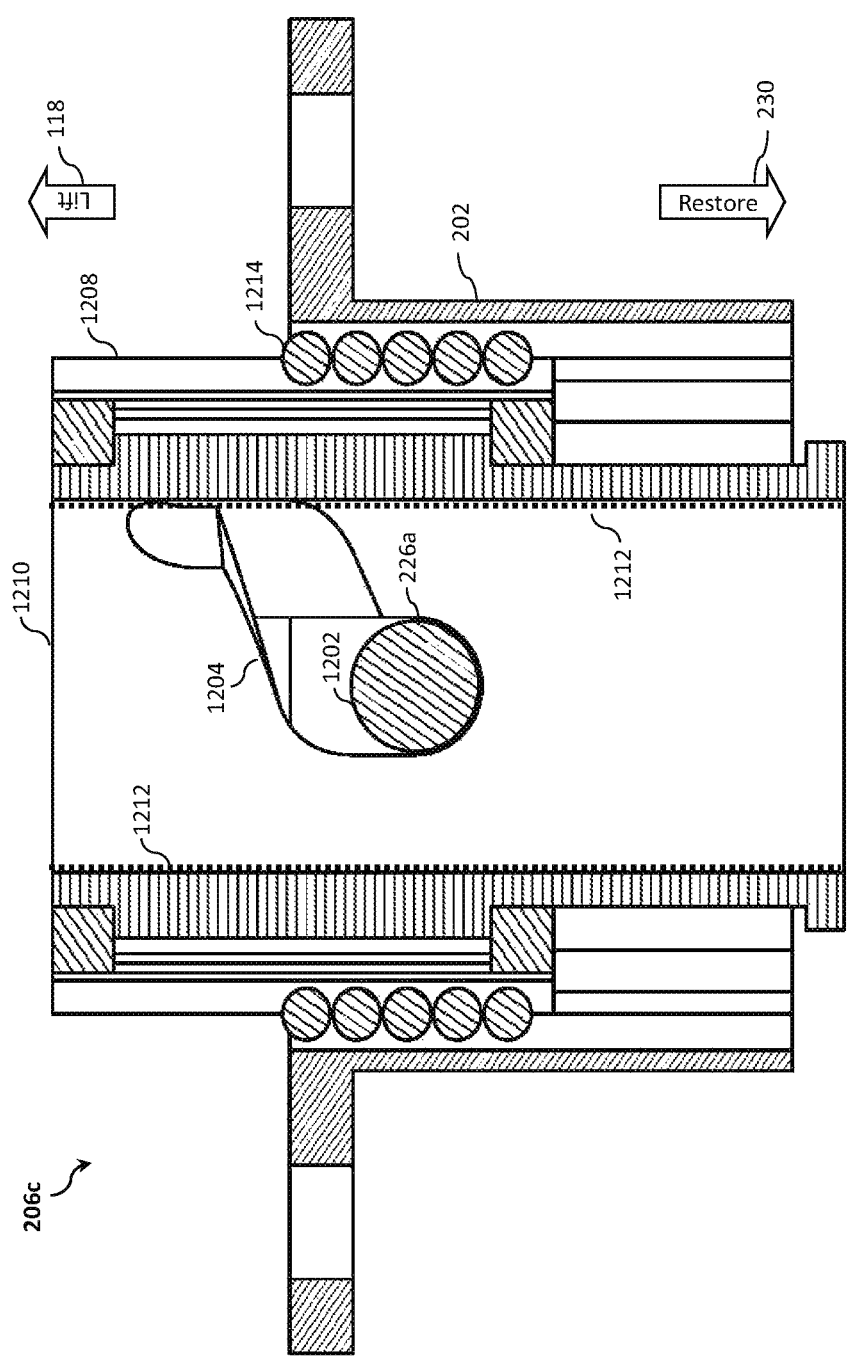

FIG. 13 illustrates a cross sectional diagram of the third hub assembly in accordance with one example.

Figure 14:
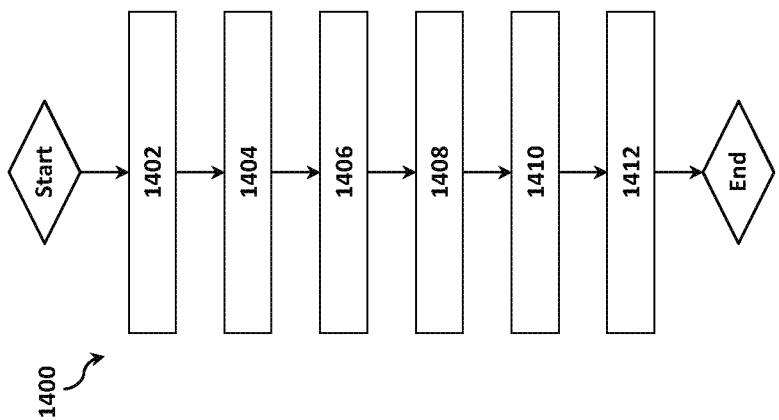

FIG. 14 illustrates a flowchart illustrating a method of operating the rotor assembly according to one or more examples described herein.

Figure 15:
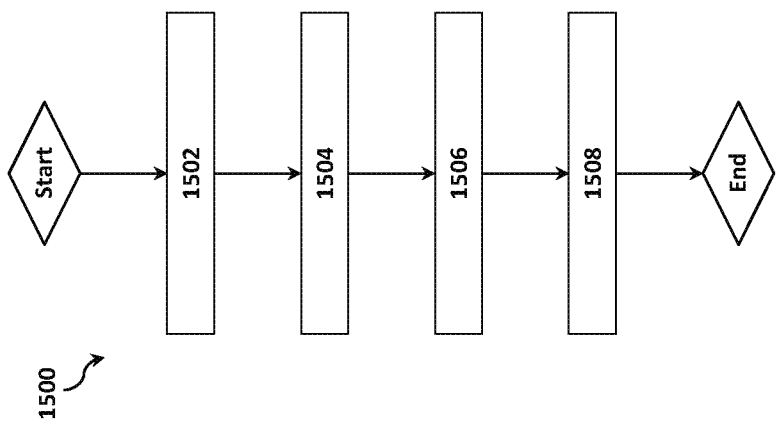

FIG. 15 illustrates a method of configuring a hub assembly

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the terms "aerial vehicle" and "aircraft" are used interchangeably and refer to a machine capable of flight, including, but not limited to, both traditional runway and VTOL aircraft, and also including both manned and unmanned aerial vehicles. VTOL aircraft may include fixed-wing aircraft, rotorcraft (e.g., helicopters, multirotor, etc.), and/or tilt-rotor/tilt-wing aircraft.

As used herein, the term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the term "composite material" refers to a material comprising an additive material and a matrix material. For example, a composite material may comprise a fibrous additive material (e.g., fiberglass, glass fiber ("GF"), carbon fiber ("CF"), aramid/para-aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may include a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

As used herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

The present disclosure is directed to rotor assemblies for scissoring rotors, aircraft including the same, and associated methods. As explained above, it is desirable to both reduce drag during cruise operation and maintain lift efficiency during VTOL operation; however, existing solutions are typically more complex, heavy, and expensive. To that end, disclosed herein is a rotor assembly (e.g., a scissoring rotor assembly) for a VTOL aircraft that reduces drag during cruise operation and maintains lift efficiency during VTOL operation, while mitigating the oscillating bending moments. More particularly, the present disclosure is directed to rotor assemblies that include a plurality of stacked rotors that are configured to transition (fold and unfold) between a deployed configuration to generate thrust during VTOL operation and a stowed configuration to reduce drag during cruise operation. Where the rotor assemblies have a fixed axis of rotation, the rotor assemblies generate a vertical thrust during VTOL operation; however, rotor assemblies with a movable axis of rotation (e.g., pivoting) can generate a thrust that can transition between vertical and horizontal orientations depending on the stage of flight. As will be described below, the rotor assembly is configured to assume a stowed configuration where its multiple rotors scissor relative to one another (e.g., fold and stack on top of each other) and align (e.g., rotation stopped) with the direction of the main airstream during cruise operation, thereby reducing drag. Other arrangements are contemplated, however. For example, the blades can be stowed pointing towards the direction of flight to avoid additional drag or in any direction for the purpose of locking the blades in place to mitigate oscillation, vibration, efficiency decrease, etc. During VTOL operation, the stacked rotors are configured to unfold (e.g., axially rotate to a predetermined arrangement relative to one another), while maintaining lift efficiency.

The rotor assemblies disclosed herein employ a rotary guide to guide and fold (or unfold) the rotor assembles during transition between VTOL operation and cruise operation. The rotary guide can be passively driven by a lifting force from the rotors, thereby obviating a requirement for pilot involvement or a biasing mechanism to actively unfold the rotor assemblies. For example, the lifting force from the rotor assembles can be used to unfold the rotors to assume the deployed configuration for VTOL operation, wherein a bias mechanism may be provided to fold the rotors to assume a stowed configuration for cruise operation. However, as will be described, one or more biasing mechanisms may be provided to actively unfold the rotors to assume a deployed configuration for VTOL operation or to actively fold the rotors to assume a stowed configuration. For example, an actuator (e.g., a linear actuator) may be used to urge a portion of the rotor assemblies along the rotary guide to accomplish a fold/unfold behavior.

Figure 1A:
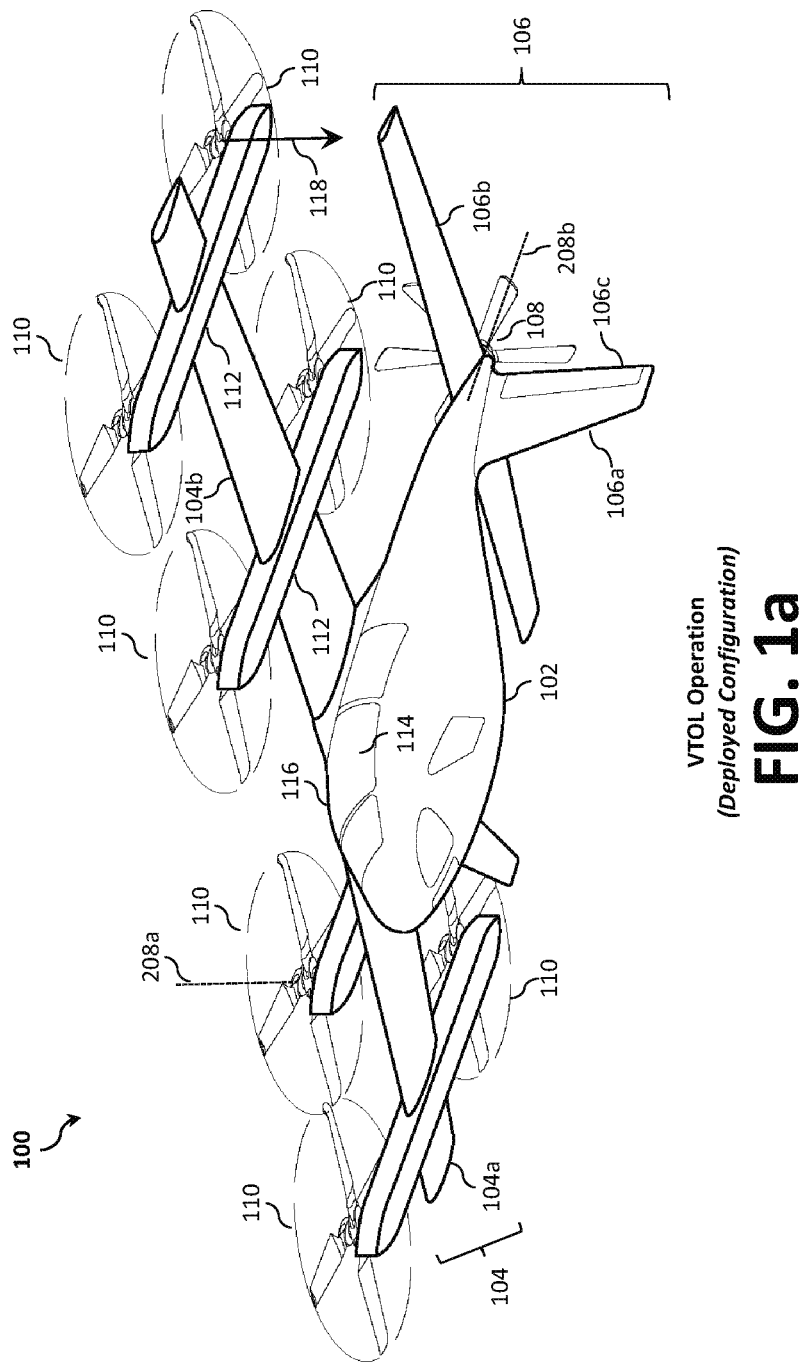
FIG. 1a illustrates an aircraft including a plurality of rotor assemblies according to examples described herein, wherein the rotor assemblies are in the deployed configuration for vertical take-off and landing (VTOL) operation.
Figure 1B:
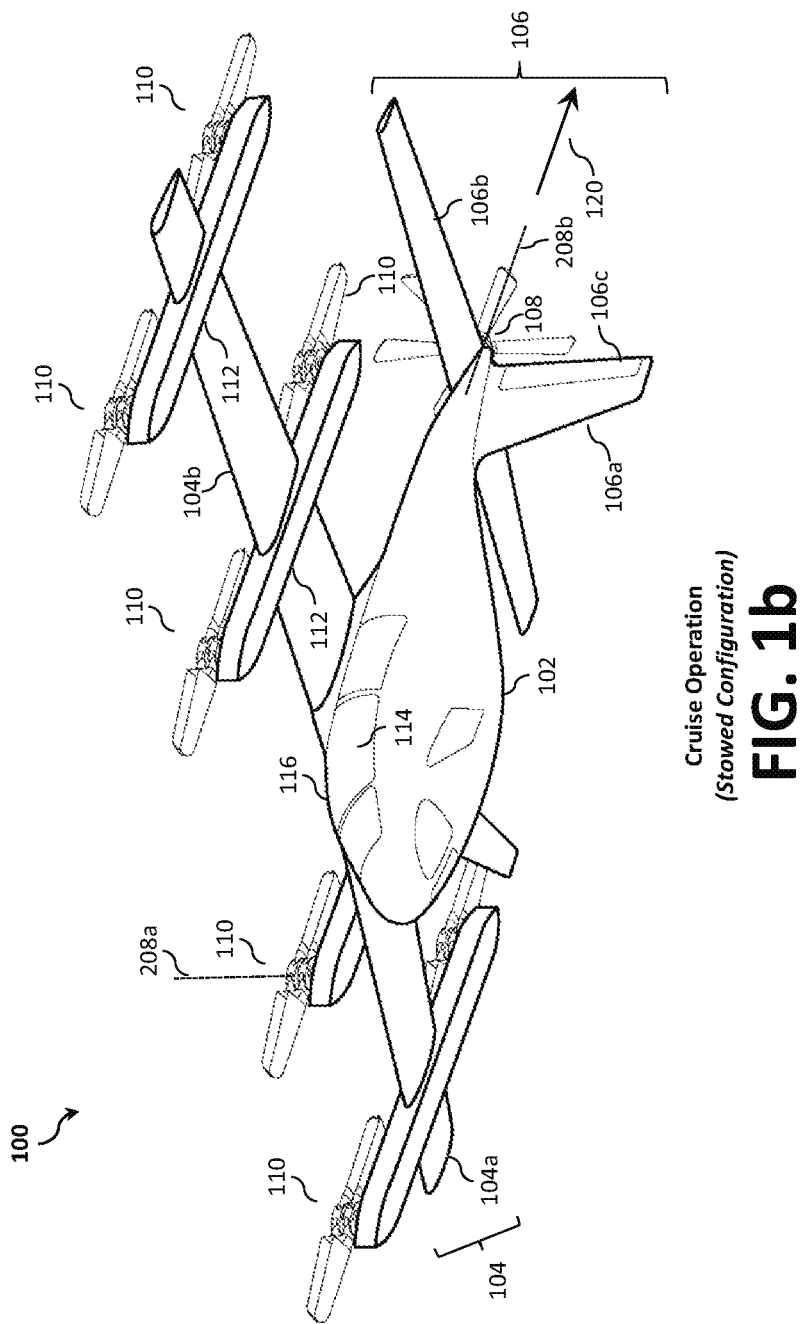
FIG. 1b illustrates the aircraft of FIG. 1a, wherein the rotor assemblies are in the stowed configuration for cruise operation.

FIGS. 1a and 1b illustrate an aircraft 100 including a plurality of rotor assemblies 110 according to examples described herein. More particularly, FIG. 1a illustrates the aircraft 100 with the rotor assemblies 110 configured in a deployed configuration for vertical take-off and landing (VTOL) operation, while FIG. 1b illustrates the aircraft 100 with the rotor assemblies configured in the stowed configuration for cruise operation (e.g., the cruise phase of flight). The aircraft 100 can be configured to carry passengers and/or cargo.

As illustrated, the aircraft 100 generally comprises an airframe 102 (e.g., a fuselage) having a wing set 104 having a starboard-side wing 104a and a port-side wing 104b. While the wing set 104 is illustrated as generally linear with tapered outboard wing tips, other wing configurations are contemplated, such as back-swept, non-tapered, rectangular, elliptical, forward-swept, and the like. The airframe 102 further includes an empennage 106 with one or more vertical stabilizers 106a and/or horizontal stabilizers 106b, which may be configured in one of multiple tail configurations. To assist with controlled flight, the aircraft 100 may further comprise one or more moveable control surfaces or additional aerodynamic surfaces. For example, each of the wing set 104 and/or vertical stabilizers 106a may include a fixed leading section and a moveable portion pivotably coupled to a trailing edge of the fixed leading section, such as one or more trailing edge flaps, trim tabs, and/or rudder 106c.

As illustrated, the airframe 102 includes a cockpit/cabin 114 for one or more human operators and/or passengers. The aircraft 100 may be used as, for example, an air taxi, emergency vehicle (e.g., ambulance), pleasure craft, cargo transport, etc. The illustrated cockpit/cabin 114 includes a forward facing transparent aircraft canopy 116 that may be fabricated from, for example, a glass material, and/or an acrylic material. The aircraft 100 is generally illustrated as having a cockpit for manned operation, but may also be configured as unmanned (i.e., requiring no onboard pilot) or as both unmanned and fully autonomous (i.e., requiring neither an onboard pilot nor a remote control pilot). For example, the aircraft 100 may be remotely controlled over a wireless communication link by a human operator, computer operator (e.g., remote autopilot), or base station. In an unmanned arrangement, the cockpit/cabin 114 may be omitted.

The various structural components of the aircraft 100 may be fabricated from metal, a metal alloy, a composite material, wood, plastic (or other polymer), or a combination thereof. In certain aspects, portions of the aircraft 100 (e.g., the airframe 102 and/or the wing set 104) may be fabricated using one or more additive manufacturing/3D printing techniques, such as fused deposition modeling (FDM), stereolithography (SLA), selective laser sintering (SLS), and/or any other suitable type of additive manufacturing/3D printing.

To facilitate cruise operation and VTOL operation, the aircraft 100 includes one or more propellers 108 and a plurality of rotor assemblies 110. As illustrated, a propeller 108 is coupled to the aft end of the airframe 102 and oriented to generate a horizontal force 120 (a cruise thrust) relative to the airframe 102 (e.g., parallel to the roll axis of the aircraft 100), while the plurality of rotor assemblies 110 are coupled to the wing set 104 and oriented to generate a lifting force 118 (vertical thrust) relative to the airframe 102 to provide lift to the airframe 102 (e.g., parallel to the yaw axis of the aircraft 100), such as during the VTOL operation. The propeller 108 and the rotor assemblies 110, which are each illustrated as having a fixed axis of rotation 208a, 208b, may spin in a clockwise or a counter-clockwise direction about its respective axis of rotation 208a, 208b. In certain aspects, rotor assemblies 110 on one side of the airframe 102 may spin in a clockwise direction while the rotor assemblies 110 on the other side of the airframe 102 may spin in a counter-clockwise direction. One of skill in the art would appreciate that the blade pitch of the rotor blades would be adjusted depending on the rotational direction.

While illustrated as coupled to the wing set 104 via one or more booms 112, the plurality of rotor assemblies 110 can alternatively or additionally be coupled directly to the wing set 104 or to other structural components of the aircraft, such as the airframe 102, empennage 106, etc. Similarly, while a single propeller 108 is illustrated as coupled to the airframe 102 at its aft end, one or more propellers 108, turbines, or jet engines may instead be coupled to other structural components of the aircraft 100 (e.g., the wing set 104, the empennage 106, etc.) to provide horizontal thrust (e.g., during cruise operation).

During the VTOL operation, as best illustrated in FIG. 1a, the plurality of rotor assemblies 110 are driven (whether via an electric motor, engine, or otherwise) to generate vertical thrust to provide vertical lift to enable the aircraft 100 to take-off, hover, transition, and land. The number and locations of the rotor assemblies 110 shown in FIGS. 1a and 1b are merely for example, and can vary as desired. Further, although each rotor assembly 110 is illustrated as including four rotor blades, the rotor assemblies 110 include a different number of blades in other embodiments. For example, as will be described below, each rotor assembly 110 may employ three stacked 2-bladed rotors, resulting in six rotor blades.

During the cruise operation, as best illustrated in FIG. 1b, the wing set 104 sustains wing-borne flight for the aircraft 100, thus unloading the plurality of rotor assemblies 110. As will be appreciated by those of ordinary skill in the art, wing-borne flight refers to the type of flight where lift is provided to an aircraft via one or more airfoils (e.g., wing set 104), thereby obviating the need for vertical thrust (e.g., from the rotor assemblies 110). When aircraft 100 transitions from a VTOL operation to cruise operation, the rotor assemblies 110 are not operating (e.g., not driven). During the cruise operation, the rotor blades may assume a stowed configuration where the rotor blades are stacked vertically. While FIG. 1b illustrates the rotor assemblies 110 in a particular rotational orientation during the cruise operation, rotor assemblies 110 can have different rotational orientations in other embodiments. In other words, the rotor blades are configured to fold or wind to a stowed position for cruise operation and unfold or unwind to a deployed position for VTOL operation. During transition from VTOL operation and cruise operation, the aircraft 100 performs a transition operation during the transition phase of flight where the aircraft 100 is partially wing-borne. While the rotor blades may assume a stowed configuration for cruise operation, the aircraft 100 may commence stowing the rotors during the transition phase of flight (e.g., toward the end of the transition phase to cruise operation).

FIGS. 2a, 2b, and 2c illustrate, respectively, top, perspective, and side views of a first rotor assembly 110a having three stacked blade assemblies in a stowed configuration (0% unwind) for cruise operation. As illustrated, the rotor assembly 110 includes a hub assembly 206 configured to coaxially connect with a first blade assembly 204a, a second blade assembly 204b, and a third blade assembly 204c. The three stacked blade assemblies 204a, 204b, 204c are coaxial in that they share a common axis of rotation 208a. In the illustrated example, the second blade assembly 204b is stacked on top of the third blade assembly 204c, which in turn is stacked on the first blade assembly 204a. The first blade assembly 204a is illustrated as being closest to the motor or engine. While three rotor assemblies are illustrated, additional or fewer rotor assemblies may be stacked. For example, fourth, fifth, sixth, etc. blade assemblies may be stacked between the first blade assembly 204a and the second blade assembly 204b. FIGS. 3a, 3b, and 3c illustrate, respectively, top, perspective, and side views of the first rotor assembly 110a of FIGS. 2a through 2c in transition (50% unwind/deployed) between the stowed configuration (0% unwind, i.e., folded) and a deployed configuration (100% unwind/deployed, i.e., unfolded). FIGS. 4a, 4b, and 4c illustrate, respectively, top, perspective, and side views of the first rotor assembly 110a of FIGS. 2a through 2c in the deployed configuration.

FIG. 5a illustrates a detailed perspective view of the first rotor assembly 110a having three blade assemblies in the stowed configuration for cruise operation. As illustrated, the first hub assembly 206a is configured to receive a rotational force from a drive shaft 212, which is used to drive each of the first, second, and third blade assemblies 204a, 204b, 204c via its respective first, second, and third rotor hubs 202a, 202b, 202c. The first hub assembly 206a may be mounted directly to the drive shaft 212 of the motor (or engine) and configured to spin in sync with motor (or engine). Therefore, the first hub assembly 206a effectively dictates the RPM and unfold angles (via rotary guide 226) of the second and third hub assemblies 206b, 206c coupled thereto.

As illustrated, the first hub assembly 206a comprises a first hub subassembly 214 configured to rotate a first blade assembly 204a about an axis of rotation 208a in a first plane 228a, a second hub subassembly 216 configured to rotate a second blade assembly 204b about the axis of rotation 208a in a second plane 228b, and a third hub subassembly 218 configured to rotate a third blade assembly 204c about the axis of rotation 208a in a third plane 228c. As illustrated, the first, second, and third planes 228a, 228b, 228c are parallel to one another. Two or more rotary guides 226 are provided to control axial positions (e.g., angle) between the first, second, and third subassemblies 214, 216, 218 relative to one another. In operation, the drive shaft 212 of the motor drives (spins/rotates) the first hub subassembly 214 about the axis of rotation 208a, which then drives (at the same RPM), the second hub subassembly 216 via a first rotary guide 226 and, where applicable, third hub subassembly 218 via a second rotary guide 226. The lifting force 118 from the rotors (e.g., second and third rotor blade assemblies 204b, 204c) causes the first hub assembly 206a to automatically unfold the rotor blade assemblies from the stowed configuration to the deployed configuration.

The rotary guides 226 may be configured as channels, tracks, or the like to guide the hub subassemblies mechanically about the axis of rotation 208a. In operation, the one or more rotary guides 226 provide controlled angular positioning of the rotor blade assemblies 204a, 204b, 204c with respect to other stacked blades on the same axis of rotation 208a. For example, a first rotary guide 226 is configured to control an axial position of the third hub subassembly 218 relative to the first hub subassembly 214 about the axis of rotation 208a. The first rotary guide 226 is configured to be driven with a lifting force 118 generated by the second blade assembly 204b and/or the third blade assembly 204c. Similarly, a second rotary guide 226 is configured to control an axial position of the second hub subassembly 216 relative to the third hub subassembly 218 about the axis of rotation 208a as a function of the lifting force 118.

As those of skill in the art will appreciate, the amount of lifting force 118 may be different for each of the first, second, and third blade assemblies 204a, 204b, 204c. For example, the amount of lift (or the RPM required) to generate the lifting force 118 may vary when the stacked first, second, and third blade assemblies 204a, 204b, 204c are not identical (e.g., they may have airfoils of different shape and/or size) and/or may vary when RPM for each of the first, second, and third blade assemblies 204a, 204b, 204c are differentiated. Further, the downwash from the first, second, and third blade assemblies 204a, 204b, 204c may also affect the amount of lift generated, such that the lift may be different depending on the position of the blades in the stack.

The first blade assembly 204a defines a first longitudinal axis 210a and is configured to rotate about the axis of rotation 208a (e.g., a vertical axis) in the first plane 228a, while the second blade assembly 204b defines a second longitudinal axis 210b and is configured to rotate about the axis of rotation 208a in the second plane 228b, and the third blade assembly 204c defines a third longitudinal axis 210c and is configured to rotate about the axis of rotation 208a in the third plane 228c. The first blade assembly 204a includes a first rotor blade 204a_1 and a second rotor blade 204a_2 joined to one another via a first rotor hub 202a, the second blade assembly 204b includes a first rotor blade 204b_1 and a second rotor blade 204b_2 joined to one another via a second rotor hub 202b, and the third blade assembly 204c includes a first rotor blade 204c_1 and a second rotor blade 204c_2 joined to one another via a third rotor hub 202c. While the first, second, and third blade assemblies 204a, 204b, 204c are each illustrated as a 2-blade propeller, other propeller arrangements are contemplated, such as 3-blade propellers, 4-blade propellers, etc. In the stowed configuration, the first, second, and third longitudinal axes 210a, 210b, 210c are arranged such that they are stacked (in parallel first, second, and third planes 228a, 228b, 228c) and aligned parallel to one another in the lengthwise direction to reduce drag during cruise operation and to reduce size when stowed (e.g., when on the ground).

FIG. 5b illustrates a detailed top view of the first rotor assembly 110a in the deployed configuration for VTOL operation. As illustrated, the first, second, and third blade assemblies 204a, 204b, 204c are deployed (e.g., unwound) such that the first, second, and third blade assemblies 204a, 204b, 204c are evenly distributed about the axis of rotation 208a. In the case of three 2-bladed rotor assemblies, each rotor blade is positioned 60 degrees off from its adjacent rotor blades (i.e., 360 degrees divided by 6 blades). The degree offset (e.g., angle relative to one another) will depend on the number of rotor assemblies and the number of rotor blades. For example, in the case of three 3-bladed rotor assemblies, each rotor blade would be positioned 40 degrees off from the adjacent rotor blades (i.e., 360 degrees divided by 9 blades). While illustrated and described as evenly distributed, it is contemplated that the first, second, and third blade assemblies 204a, 204b, 204c may instead be unevenly distributed, if desired.

FIG. 5c illustrates a cut-away diagram of a first hub assembly 206a of the first rotor assembly 110a in the stowed configuration. As illustrated, first hub assembly 206a transfers rotational force from the drive shaft 212 to each of the first, second, and third blade assemblies 204a, 204b, 204c, directly or indirectly. The first hub assembly 206a of the first rotor assembly 110a of FIGS. 2a through 2c can be generally divided into a first section 500a corresponding to the first blade assembly 204a (e.g., a lower section), a second section 500b corresponding to the second blade assembly 204b (e.g., an upper section), and a third section 500c corresponding to the third blade assembly 204c (e.g., an intermediate section). While a single intermediate section (i.e., third section 500c) is illustrated, one or more additional intermediate sections may be provided to accommodate fourth, fifth, sixth, etc. blade assemblies that may be stacked between the first blade assembly 204a and the second blade assembly 204b. In certain aspects, the third section 500c may be omitted where only two blade assemblies are desired, an example of which is illustrated and discussed below in connection with FIGS. 6a through 6c.

The first section 500a (illustrated as the lower-most section) includes a first hub subassembly 214 coupled to the first blade assembly 204a via the first rotor hub 202a and configured to receive a rotational force from the drive shaft 212 and to rotate the first blade assembly 204a about the axis of rotation 208a in the first plane 228a. The first blade assembly 204a is fixedly coupled to the outer wall 214a of the first hub subassembly 214. The drive shaft 212 may be drive by an electric motor, engine, etc. The first hub subassembly 214 is sized and shaped to mechanically engage the third hub subassembly 218 (e.g., the intermediate hub subassembly) via a rotary guide 226. One or more friction-reducing elements 220 may be placed between the guide surfaces of the rotary guide 226 to reduce friction at the moving portions between the first hub subassembly 214 and the third hub subassembly 218. Example friction-reducing elements 220 include, for example, bearings, bushings, etc.

The third section 500c (illustrated as an intermediate section) includes a third hub subassembly 218 coupled to the third blade assembly 204c via the third rotor hub 202c and configured to receive a rotational force from the first hub assemble 214 and to rotate the third blade assembly 204c about the axis of rotation 208a in the third plane 228c. The third blade assembly 204c is fixedly coupled to the outer wall 218a of the third hub subassembly 218. The third hub subassembly 218 is sized and shaped to mechanically engage both the second hub subassembly 216 (e.g., the upper hub subassembly) and the first hub subassembly 214 via rotary guides 226. One or more friction-reducing elements 220 may be similarly placed between the moving guide surfaces of each rotary guide 226 to reduce friction between the third hub subassembly 218 and each of the first and second hub subassemblies 214, 216.

The second section 500b (illustrated as the upper-most section) includes a second hub subassembly 216 coupled to the second blade assembly 204b via the second rotor hub 202b and configured to receive a rotational force from the third hub subassembly 218 and to rotate the second blade assembly 204b about the axis of rotation 208a in the second plane 228b. The second blade assembly 204b is fixedly coupled to the second hub subassembly 216. The second blade assembly 204b is fixedly coupled to the outer wall 216a of the second hub subassembly 216. The positioning of the second section 500b may vary as well in the stacking order. For example, the second section 500b may be closest to the motor.

The second hub subassembly 216 and third hub subassembly 218 are configured to move relative to the first hub subassembly 214 between a first linear position associated with a stowed configuration and a second linear position associated with a deployed configuration as a function of the lifting force 118 and the restoring force 230 (discussed below). For example, the second hub subassembly 216 and third hub subassembly 218 are configured to move linearly toward and away from the first hub subassembly 214 along the axis of rotation 208a (e.g., in a direction that is parallel to the axis of rotation 208a) to transition between stowed and cruise configurations. During operation, controlling the linear position of the second hub subassembly 216 between the first linear position and the second linear position via the lifting and restoring forces 118, 230, for example, moves the second hub subassembly 216 between axial positions to unfold the rotor blades of the first rotor assembly 110a via the rotary guide 226.

The rotary guide 226 comprises one or more guide segments arranged to define a ramp, which can be shaped to control a rate at which the second hub subassembly 216 moves between the first axial position (e.g., associated with a stowed configuration) and the second axial position (e.g., associated with a deployed configuration). For example, the rotary guide 226 can define a first guide segment 226a (e.g., positioned at a first end of the rotary guide 226), a second guide segment 226b (e.g., positioned at a second end of the rotary guide 226), and a third guide segment 226c that is positioned between the first guide segment 226a and the second guide segment 226b. In the stowed configuration, the first, second, and/or third blade assemblies 204a, 204b, 204c are arranged at a first angle relative to one another, such as 0 degrees (e.g., a stacked arrangement, examples of which are illustrated in FIGS. 5a and 6a). In the deployed configuration, the first, second, and/or third blade assemblies 204a, 204b, 204c are arranged at a second angle relative to one another (e.g., an unfolded arrangement, examples of which are illustrated in FIG. 5b as 60 degrees and in FIG. 6b as 90 degrees).

The first guide segment 226a can be configured to secure the second hub subassembly 216 at a first axial position relative to the first hub subassembly 214 and the second guide segment 226b can configured to secure the second hub subassembly 216 at a second axial position relative to the first hub subassembly 214. Depending on the direction of the ramp angle (e.g., whether angled upward, as illustrated, or downward) and/or axis of rotation 208a (e.g., whether the rotors spin clockwise or counter-clockwise), the first axial position may be associated with the stowed configuration and the second axial position may be associated with the deployed configuration, or vice versa. In the illustrated example, the hub subassembly closest to the motor follows the motor, while the remaining hub subassemblies move relative to that closest hub subassembly. The third guide segment 226c is positioned between the first and second guide segments 226a, 226b that allows the rotor to rotate about the axis of rotation 208a, but still within a controlled fashion. For example, the third guide segment 226c is shaped to allow the second hub subassembly 216 to rotate about the axis of rotation 208a relative to the first hub subassembly 214 to transition between the first axial position and the second axial position. As illustrated, the third guide segment 226c defines a ramp (e.g., is angled) to control the transition between stowed and deployed configurations of the first, second, and third blade assemblies 204a, 204b, 204c. The third guide segment 226c, in essence, serves as a transitional ramp between the first and second guide segments 226a, 226b.

As illustrated in FIG. 5c, for example, the first, second, and third hub subassemblies 214, 216, 218 may be shaped with guide surfaces that define the channel shape of the rotary guide 226. For example, with regard to the example of FIG. 5c, the first hub subassembly 214 is shaped to define the upper portion of the rotary guide 226 of first section 500a, while the third hub subassembly 218 is shaped to define the lower portion of the rotary guide 226 of first section 500a. Similarly, the second hub subassembly 216 is shaped to define the lower portion of the rotary guide 226 of third section 500c (the intermediate section), while the third hub subassembly 218 is shaped to define the upper portion of the rotary guide 226 of third section 500c. Alternatively, a pin and slot arrangement may be employed where a pin is fixed to one part and arranged to travel in a channel defined by the other part, an example of which is described in connection with FIGS. 12a through 12d.

In operation, the upper rotors (e.g., the second blade assembly 204b) and, where applicable, the intermediate rotors (e.g., the third blade assembly 204c) generate a lifting force 118 that urges the second hub subassembly 216 (along with the third hub subassembly 218) away from the first hub subassembly 214, which in turn translates, inter alia, the second hub subassembly 216 along the ramp (e.g., along the first, second, and third guide segments 226a, 226b, 226c) between the stowed and deployed configurations. In other words, as the second hub subassembly 216 is urged away from the first hub subassembly 214, the one or more rotary guides 226 rotates the second hub subassembly 216 along its ramp to adjust the axial angle.

The first hub assembly 206a may further comprises a first biasing mechanism 222 (e.g., a spring, actuator, etc.) to provide a restoring force 230 that, together with gravity (under the weight of the second section 500b, rotor assemblies, etc.), urges the second section 500b (along with any intermediate section, such as the third section 500c) toward the first section 500a and into the second axial position. The restoring force 230 urges the second section 500b toward the first section 500a when the lifting force 118 is less than a given lifting threshold, for example, when the rotor assembly 110 are not driven or only partially driven (e.g., during cruise operation, during portions of transition between VTOL and cruise operation, and when landed). When the rotor assembly 110 is driven (e.g., during VTOL operation), the lifting force 118 generated by the rotors of the second section 500b (and any intermediate sections, such as the third section 500c) meets the lifting threshold to overcome the restoring force 230 and urges the second section 500b away from the first section 500a at which point the rotary guides 226 adjusts the axial angle. The first biasing mechanism 222 may be sized and shaped to define the lifting threshold at which point the lifting force 118 overcomes the restoring force 230 imparted by the first biasing mechanism 222.

Using a spring as the first biasing mechanism 222 between the first hub subassembly 214 (bottom section) and the second hub subassembly 216 (top section) offers certain advantages. For example, a spring provides is entirely passive (i.e., no need for wires, actuators, etc.) and does not require multiple components; however, a spring does require some maintenance and does not allow for dynamic control. Alternatively, an actuator or vacuum system may be used as the first biasing mechanism 222. For example, an actuator, for example, may be attached to the second hub subassembly 216 (top section) (or to the first hub subassembly 214) and configured to pull the first and second hub subassemblies 214, 216 toward one another. The actuator may further be configured to push the first and second hub subassemblies 214, 216 away from one another. Using an actuator enables allows for dynamic control and adjustments to the restoring force 230 during operation. For example, the actuator may be controlled to provide a restoring force 230 that pushes, pulls, or locks the assembly in a specific configuration. Therefore, an advantage of using an actuator is the ability to serve as an override system that selectively places or locks the rotor assembly 110 in a desired configuration, such as the deployed configuration or the stowed configuration. Actuators, however, increase weight, power consumption, and can be more complex to integrate. In another alternative, the internal section of the hub assembly 206 can be vacuum sealed to draw the first and second hub subassemblies 214, 216 toward one another. A vacuum seal affords a low maintenance solution, but can be difficult to seal.

In operation, regardless of the type of first biasing mechanism 222, the lifting force 118 from the rotors must still overcome the first biasing mechanism 222 to transition from the first guide segment 226a associated with a stowed configuration to a second guide segment 226b associated with a deployed configuration. The third guide segment 226c forces the action of deploying rotation to act against the first biasing mechanism 222, such as a mechanical spring or other biasing mechanism (air spring, pressure, gravity, etc.). As the lifting force 118 from the rotor(s) begins to increase and meets the lifting threshold, the lifting force 118 overcomes the first biasing mechanism 222, rotates from the stowed track section (e.g., the first guide segment 226a) along the third guide segment 226c, and then ultimately locks into the deployed track section (e.g., the second guide segment 226b). As lift increases beyond this lifting threshold, the rotor remains locked in the first guide segment 226a. The rotor remains locked in the deployed configuration as long as the rotor provides at least the minimum amount of lifting force 118 (e.g., during VTOL operation) to meet or exceed the lifting threshold. The lift range between excess lift and minimum deployed lift, provides variability in thrust as required for operation of propeller stabilized aircraft. The rotary guide 226 can be designed such that the rotationally locked fold/unfold positions are an extended portion of the lift range, with the transition range being a shorter portion. Likewise, the locking positions can be designed such that the transition range (e.g., the third guide segment 226c) is extended. The third guide segment 226c can be angled in either direction, which depends on the rotation direction, rotor drag, or rotor momentum can help aid the scissoring action of the rotor.

In certain aspects, the first hub assembly 206a may further comprise a second biasing mechanism 224 (e.g., a mechanical actuator) configured to provide a force that opposes or overrides forces (such as those from the first biasing mechanism 222) to secure the axial position of the second hub subassembly 216 relative to the first hub subassembly 214. For example, when a passive first biasing mechanism 222 is used (e.g., a spring), it may still be desirable to selectively configure the first hub assembly 206a in either the deployed or stowed configurations, regardless of flight status. Therefore, the force from the second biasing mechanism 224 (e.g., an override force) may be used to effectively override forces generated by, or imparted on, the first biasing mechanism 222 or the aircraft 100 (e.g., lifting force 118). To that end, the second biasing mechanism 224 can be configured to overcome any lifting force 118 from the rotors and/or biasing force 230 from the first biasing mechanism 222, thereby selectively pushing or pulling the second hub subassembly 216 relative to the first hub subassembly 214 to guide the second hub subassembly 216 in a desired axial position. As noted above, this functionality can also be provided when using an actuator or other controllable device as the first biasing mechanism 222.

FIGS. 6a, 6b, and 6c illustrate, respectively, top, perspective, and side views of a second rotor assembly 110b having two stacked blade assemblies. The second hub assembly 206b is substantially the same as the first hub assembly 206a discussed in connection with FIGS. 5a through 5c, except the intermediate hub subassemblies (e.g., third hub subassembly 218) are omitted, thereby decreasing the number of rotor assemblies and rotor blades. Therefore, for brevity, the structure, function, and operation of the various components described above in connection with the first hub assembly 206a will not be repeated in connection with the second hub assembly 206b.

FIG. 6a illustrates a detailed perspective view of the second rotor assembly 110b in a stowed configuration, while FIG. 6b illustrates a detailed top view of the second rotor assembly 110b in a deployed configuration. FIG. 6c illustrates a cut-away diagram of a second hub assembly 206b of the second rotor assembly 110b in the stowed configuration. As illustrated, the second hub assembly 206b comprises a first hub subassembly 214 configured to rotate a first blade assembly 204a about the axis of rotation 208a in a first plane 228a, a second hub subassembly 216 configured to rotate a second blade assembly 204b about the axis of rotation 208a in a second plane 228b, and a rotary guide 226 configured to control an axial position of the second hub subassembly 216 relative to the first hub subassembly 214 about the axis of rotation 208a. The rotary guide 226 is configured to adjust the axial position of the second hub assembly 206b as a function of a lifting force 118 generated by the second blade assembly 204b.

As best illustrated in FIG. 6b, the first and second blade assemblies 204a, 204b of the second rotor assembly 110b are rotated (e.g., unwound) such that the first and second blade assemblies 204a, 204b are evenly distributed about the axis of rotation 208a. In the case of two 2-bladed rotor assemblies, each rotor blade is arranged/positioned 90 degrees off from its adjacent rotor blades (i.e., 360 degrees divided by 4 blades). Again, the degree offset will depend on the number of rotor assemblies and the number of rotor blades. For example, in the case of three 2-bladed rotor assemblies, each rotor blade would be positioned 60 degrees off from the adjacent rotor blades (i.e., 360 degrees divided by 6 blades).

FIG. 6c illustrates a cut-away diagram of a second hub assembly 206b of the second rotor assembly 110b in the stowed configuration. As illustrated, second hub assembly 206b transfers rotational force from the drive shaft 212 to each of the first and second blade assemblies 204a, 204b. The second hub assembly 206b of the second rotor assembly 110b can be generally divided into a first section 500a corresponding to the first blade assembly 204a (e.g., a lower section) and a second section 500b corresponding to the second blade assembly 204b (e.g., an upper section). As illustrated, the first hub subassembly 214 drives the second hub assembly 206b directly.

In operation, the upper rotor (e.g., the second blade assembly 204b) generates a lifting force 118 that urges the second hub subassembly 216 away from the first hub subassembly 214, which in turn translates, inter alia, the second hub subassembly 216 along the ramp of the rotary guide 226 between the stowed and deployed configurations. In other words, as the second hub subassembly 216 is urged away from the first hub subassembly 214, the rotary guide 226 rotates the second hub subassembly 216 along its ramp to adjust the axial angle.

FIG. 7 illustrates a side cross-sectional view of the first hub assembly 206a for use with the first rotor assembly 110a with the first, second, and third blade assemblies 204a, 204b, 204c omitted. The outer walls 214a, 218a of the first hub subassembly 214 and the second hub subassembly 216 are cut away to better illustrate the rotary guide 226. As mentioned above, the first, second, and third hub subassemblies 214, 216, 218 are shaped to define the rotary guide 226. The first, second, and third hub subassemblies 214, 216, 218 may be fabricated from metal, a metal alloy, a composite material, wood, plastic (or other polymer), or a combination thereof. In certain aspects, each of the first, second, and third hub subassemblies 214, 216, 218 may be fabricated as a unitary structure (e.g., single component. For example, the first, second, and third hub subassemblies 214, 216, 218 may be milled from a single block of material or fabricated using one or more additive manufacturing/3D printing techniques, such as fused deposition modeling (FDM), stereolithography (SLA), selective laser sintering (SLS), and/or any other suitable type of additive manufacturing/3D printing.

FIGS. 8a and 8b illustrates top and cross-sectional side views of the first hub subassembly 214 of the first hub assembly 206a, where the outer wall 214a is cut away in FIG. 8b to better illustrate the portion of the rotary guide 226. The outer wall 214a of the first hub subassembly 214 is sized and shaped to secure the first rotor hub 202a. The first rotor hub 202a may be fixedly coupled to the first hub subassembly 214 (e.g., at its outer wall 214a) via, for example, screws, bolts, rivets, or the like. The first hub subassembly 214 is fixedly coupled the drive shaft 212 to receive a rotational force from the drive shaft 212 and to rotate about the axis of rotation 208a. As illustrated, a guide surface 802 of the first hub subassembly 214 is sized and shaped to define a portion (e.g., a portion of the third guide segment 226c) of the rotary guide 226 that, in the case of the first hub assembly 206a, engages a guide surface 1006 of the lower section 1004 of the third hub subassembly 218 or, in the case of the second hub assemble 206b, engages a guide surface 906 of the lower section 904 of the second hub subassembly 216.

FIGS. 9a and 9b illustrates top and side views of the second hub subassembly 216 of the first hub assembly 206a, where the outer wall 216a is cut away in FIG. 9b to better illustrate the portion of the rotary guide 226. The second hub subassembly 216 generally comprises an upper section 902 to couple to the second blade assembly 204b and a lower section 904 to engage an adjacent hub subassembly (e.g., first or third hub subassemblies 214, 218, depending on configuration). The outer wall 216a of the second hub subassembly 216 is sized and shaped to secure the second rotor hub 202b. The second rotor hub 202b may be fixedly coupled to the second hub subassembly 216 (e.g., at its outer wall 216a) via, for example, screws, bolts, rivets, or the like. As illustrated, a guide surface 906 of the second hub subassembly 216 is sized and shaped to define a portion of the rotary guide 226 that, in the case of the first hub assembly 206a, engages a guide surface 1008 of the upper section 1002 of the third hub subassembly 218 or, in the case of the second hub assemble 206b, engages a guide surface 802 of the first hub subassembly 214.

FIGS. 10a, 10b, and 10c illustrate, respectively, top, side, and cutaway side views of the third hub subassembly 218 of the first hub assembly 206a, where FIG. 10c illustrates a side view of the third hub subassembly 218 with the outer wall 218a cut away. The third hub subassembly 218 generally comprises an upper section 1002 to couple to the third blade assembly 204c and a lower section 1004, each of the upper and lower section 1002, 1004 being configured to engage an adjacent hub subassembly (e.g., first, second, or third hub subassemblies 214, 216, 218). The outer wall 218a of the upper section 1002 of the third hub subassembly 218 is sized and shaped to secure the third rotor hub 202c. The third rotor hub 202b may be fixedly coupled to the third hub subassembly 218 (e.g., at its outer wall 218a) via, for example, screws, bolts, rivets, or the like.

The upper section 1002 of second hub subassembly 216 includes a guide surface 1008 that is sized and shaped to define a portion of the rotary guide 226 that, in the case of the first hub assembly 206a, engages a guide surface 906 of the second hub subassembly 216. The lower section 1004 of second hub subassembly 216 includes a guide surface 1006 that is sized and shaped to define a portion of the rotary guide 226 that, in the case of the first hub assembly 206a, engages a guide surface 802 the first hub subassembly 214.

FIG. 11 illustrates an assembly diagram comparing the structure of the third hub subassembly 218 with portions of each of the first hub subassembly 214 and second hub subassembly 216. As mentioned above, the subject hub assemblies are not limited to use with 2 and 3 stacked blade assemblies. Where more than three stacked blade assemblies are used, additional intermediate hub subassemblies may be used, in which case, the third hub subassembly 218 may engage a hub subassembly identical to that of the third hub subassembly 218 via its upper section 1002 and/or lower section 1004, instead of the first and second hub subassemblies 214, 216. Therefore, the guide surface 1006 of the lower section 1004 may be complementary in size and shape to the guide surface 1008 of the upper section 1002, thereby allowing for stacking of multiple intermediate hub subassemblies (e.g., like that of third hub subassembly 218).

With reference to FIG. 11, the third hub subassembly 218, in essence, combines portions of the first and second hub subassemblies 214, 216. Specifically, the lower section 1004 of the third hub subassembly 218 generally corresponds to the guide surface 906 of the lower section 904 of the second hub subassembly 216, while the upper section 1002 of the third hub subassembly 218 generally corresponds to the first hub subassembly 214. If follows that, to allow for interoperability and stacking, the guide surface 906 and guide surface 1006 may be sized and shaped to define the same guide surface contour that compliments the guide surface 802 and guide surface 1008, which may likewise be sized and shaped to define the same guide surface contour.

FIGS. 12a through 12d illustrate a diagram of a third hub assembly 206c with a pin and slot arrangement in transition between stowed and deployed configurations. The third hub assembly 206c is similar to the first and second hub assemblies 206a, 206b in terms of its principle operation, but uses a pin and slot arrangement in lieu of the various guide surfaces 802, 906, 1006, 1008 formed by the first, second, and third hub subassemblies 214, 216, 218. Specifically, as illustrated, the third hub assembly 206c employs a rotary guide 226 having a pin and slot arrangement where a pin 1202 is fixed to a first hub subassembly 1210 of the third hub assembly 206c and arranged to travel in a channel 1204 of the rotary guide 226 defined by a second hub subassembly 1208.

The channel 1204 of the rotary guide 226 comprises one or more guide segments arranged to define a ramp, which can be shaped to control a rate at which the second hub subassembly 1208 moves between the first axial position (e.g., associated with a stowed configuration) and the second axial position (e.g., associated with a deployed configuration). For example, similar to the first and second hub assemblies 206a, 206b, the rotary guide 226 can define a first guide segment 226a positioned at a first end of the channel 1204, a second guide segment 226b positioned at a second end of the channel 1204, and a third guide segment 226c that is positioned between the first guide segment 226a and the second guide segment 226b.

The first guide segment 226a can be configured to secure the second hub subassembly 1208 at a first axial position relative to the first hub subassembly 1210 and the second guide segment 226b can configured to secure the second hub subassembly 1208 at a second axial position relative to the first hub subassembly 1210. The third guide segment 226c is shaped to allow the second hub subassembly 1208 to rotate about the axis of rotation 208a relative to the first hub subassembly 1210 to transition between the first axial position and the second axial position. In the illustrated example, the first and second guide segments 226a, 226b define, respectively, first and second axes 1206a, 1206b that are parallel to one another. The first and second axes 1206a, 1206b may be both parallel to each other and axially parallel (i.e., parallel to the axis of rotation 208a).

As illustrated, the first guide segment 226a is an axially parallel segment of track that locks the rotor in the folded position, while the second guide segment 226b at the other end of the channel of the rotary guide 226 is another axially parallel segment of track that locks the rotor in the unfolded position. While the first and second guide segments 226a, 226b are illustrated as generally linear along first and second axes 1206a, 1206b, other track geometries (e.g., curved or angled) that predominantly locks the rotor assembly in the selected position (e.g., folded or unfolded) are contemplated to prohibit rotation of the rotor assembly to prevent undesired folding or unfolding.

As the second hub subassembly 1208 moves toward and away from the first hub subassembly 1210, the channel 1204 guides the pin 1202 along the ramp defined by the channel 1204. In operation, like the first and second hub assemblies 206a, 206b, the upper rotor (e.g., the second blade assembly 204b) generates a lifting force 118 that urges the second hub subassembly 1208 away from the first hub subassembly 1210, which in turn translates, inter alia, the pin 1202 fixed to the second hub subassembly 1208 along the ramp of the rotary guide 226 between the stowed and deployed configurations. In other words, as the second hub subassembly 1208 is urged away from the first hub subassembly 1210, the rotary guide 226 rotates the second hub subassembly 216 along its ramp to adjust the axial angle. A rotor hub (e.g., first, second, or third rotor hubs 202a, 202b, 202c) may be fixedly coupled to one of the first and second hub subassemblies 1210, 1208 via, for example, screws, bolts, rivets, or the like.

FIG. 13 illustrates a cross sectional diagram of an example third hub assembly 206c. In this example, a blade assembly may be fixedly coupled to the second hub subassembly 1208 via a rotor hub 202. In this example, the pin 1202 is fixed to the second hub subassembly 1208 of the third hub assembly 206c and arranged to travel in a channel 1204 defined by the first hub subassembly 1210. One or more rotational bearings 1212 (represented via a dotted line) and linear bearings 1214 (represented as ball bearings) may be placed between the moving surfaces to facilitate motion between the moving parts. Movement of the moving parts of the third hub assembly 206c are constrained by the channel 1204 (e.g., a groove), which allows for axial displacement between the two parts relative to one another, but not rotational displacement. The rotational bearings 1212 allow for rotational displacement between the parts of the third hub assembly 206c, but not axial displacement. The linear bearings 1214 are configured to transmit torque between the outer and middle parts of the third hub assembly 206c. Together, the channel 1204, the rotational bearings 1212, and the linear bearings 1214 allow for torque to be transferred while controlling the rotation and axial displacement of the rotor blades with respect to each other. The linear and rotational bearings 1212, 1214 further transfer the bending moment loads to the rotor hub, thereby mitigating risk of jamming. While the linear bearings 1214 are illustrated as ball bearings, other styles are contemplated, such as roller style bearings, bushings, etc. The pin 1202 in the channel 1204 can also have a wheel/bearing at the interface between the pin 1202 and the channel 1204 to allow for smooth and reduced friction travel of the pin 1202 in the channel 1204.

FIG. 14 illustrates a method 1400 of operating a hub assembly 206 with an aircraft 100. The method 1400 may be performed by an aircraft 100, a control system associated therewith (e.g., a flight control system), and/or a pilot, whether human or autopilot.

At step 1402, the hub assembly 206 is controlled to generate a lifting force 118 via a first blade assembly 204a and a second blade assembly 204b. As discussed above, the hub assembly 206 includes a first hub subassembly 214 configured to rotate the first blade assembly 204a about an axis of rotation 208a in a first plane 228a, and a second hub subassembly 216 configured to rotate the second blade assembly 204b about the axis of rotation 208a in a second plane 228b.

At step 1404, an axial position of the first hub subassembly 214 relative to the second hub subassembly 216 about the axis of rotation 208a is controlled via a rotary guide 226. The rotary guide 226 is configured to transition, as a function of the lifting force 118, the first blade assembly 204a and the second blade assembly 204b between a stowed configuration where the first blade assembly 204a and the second blade assembly 204b are arranged at a first angle relative to one another and a deployed configuration where the first blade assembly 204a and the second blade assembly 204b are arranged at a second angle relative to one another.

At step 1406, the second hub subassembly 216 may be optionally secured at a first axial position corresponding to the deployed configuration via the first guide segment 226a or a second axial position corresponding to the stowed configuration via the second guide segment 226b.

At step 1408, the second hub subassembly 216 may be optionally biased toward the first hub subassembly 214 via a first biasing mechanism 222 to guide the second hub subassembly 216 toward the second axial position.

At step 1410, the aircraft 100 may be optionally operated in a hover phase to generate the lifting force 118. The lifting force 118 is greater than a bias force of the first biasing mechanism 222 and configured to bias the second hub subassembly 216 away from the first hub subassembly 214 and to guide the second hub subassembly 216 toward the first axial position.

At step 1412, the aircraft 100 may be optionally transitioned from the hover phase to a cruise phase where the bias force guides the second hub subassembly 216 back to the first axial position in the absence of the lifting force 118.

FIG. 15 illustrates a method 1500 of configuring a hub assembly 206 with an aircraft 100 during, for example, assembling or manufacturing thereof.

As step 1502, a hub assembly 206 is configured to receive a rotational force from a drive shaft 212. The hub assembly 206 includes a first hub subassembly 214 configured to rotate a first blade assembly 204a about an axis of rotation 208a in a first plane 228a, and a second hub subassembly 216 configured to rotate a second blade assembly 204b about the axis of rotation 208a in a second plane 228b, As step 1504, the hub assembly 206 is configured to generate a lifting force 118 via the first blade assembly 204a and the second blade assembly 204b.

As step 1506, the hub assembly 206 is configured to control an axial position of the first hub subassembly 214 relative to the second hub subassembly 216 about the axis of rotation 208a via a rotary guide 226.

As step 1508, the rotary guide 226 is configured to transition, as a function of the lifting force 118, the first blade assembly 204a and the second blade assembly 204b between a stowed configuration where the first blade assembly 204a and the second blade assembly 204b are stacked and a deployed configuration where the first blade assembly 204a and the second blade assembly 204b are not stacked.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law. It will be appreciated that the methods and systems described above are set forth by way of example and not of limitation. Numerous variations, additions, omissions, and other modifications will be apparent to one of ordinary skill in the art.

What is claimed is:

1. A method of operating a hub assembly of an aircraft comprising:
controlling the hub assembly to generate a lifting force via a first blade assembly and a second blade assembly,
wherein the hub assembly includes a first hub subassembly configured to rotate the first blade assembly about an axis of rotation in a first plane, and a second hub subassembly configured to rotate the second blade assembly about the axis of rotation in a second plane; and
controlling an axial position of the first hub subassembly relative to the second hub subassembly about the axis of rotation via a rotary guide,
wherein the rotary guide is configured to transition, as a function of the lifting force, the first blade assembly and the second blade assembly between (a) a stowed configuration where the first blade assembly and the second blade assembly are arranged at a first angle relative to one another and (b) a deployed configuration where the first blade assembly and the second blade assembly are arranged at a second angle relative to one another, and
wherein the hub assembly comprises an actuator to urge the first blade assembly and the second blade assembly into a desired axial position.

2. The method of claim 1, wherein the rotary guide comprises a first guide segment, a second guide segment, and a third guide segment that is positioned between the first guide segment and the second guide segment.

3. The method of claim 2, further comprising the step of securing the second hub subassembly at (a) a first axial position corresponding to the stowed configuration via the first guide segment or (b) a second axial position corresponding to the deployed configuration via the second guide segment.

4. The method of claim 3, further comprising the step of biasing the second hub subassembly toward the first hub subassembly via a restoring force from a first biasing mechanism to guide the second hub subassembly toward the axial position via the rotary guide.

5. The method of claim 4, further comprising the step of generating a lifting force during a hover phase of the aircraft that is greater than the restoring force of the first biasing mechanism, wherein biasing the second hub subassembly away from the first hub subassembly via the lifting force guides the second hub subassembly toward the second axial position.

6. The method of claim 5, further comprising the step of transitioning the aircraft from the hover phase to a cruise phase, wherein the restoring force guides the second hub subassembly back to the first axial position in an absence of the lifting force.

7. The method of claim 1, further comprising the step of controlling the actuator to urge the first blade assembly and the second blade assembly into the desired axial position.

8. A hub assembly comprising:
a first hub subassembly configured to rotate a first blade assembly about an axis of rotation in a first plane;
a second hub subassembly configured to rotate a second blade assembly about the axis of rotation in a second plane;
a rotary guide configured to control an axial position of the second hub subassembly relative to the first hub subassembly about the axis of rotation, wherein the rotary guide is configured to adjust the axial position as a function of a lifting force generated by the first blade assembly or the second blade assembly;
a first biasing mechanism configured to bias the second hub subassembly toward the first hub subassembly via a restoring force, and
a second biasing mechanism configured to secure the axial position of the first hub subassembly relative to the second hub subassembly.

9. The hub assembly of claim 8, wherein the rotary guide comprises a first guide segment, a second guide segment, and a third guide segment that is positioned between the first guide segment and the second guide segment.

10. The hub assembly of claim 9, wherein the first guide segment is configured to secure the second hub subassembly at a first axial position relative to the first hub subassembly and the second guide segment is configured to secure the second hub subassembly at a second axial position relative to the first hub subassembly.

11. The hub assembly of claim 10, wherein the third guide segment is shaped to define a ramp between the first guide segment and the second guide segment.

12. The hub assembly of claim 11, wherein the ramp is shaped to control a rate at which the second hub subassembly moves between (a) the first axial position and (b) the second axial position.

13. The hub assembly of claim 11, wherein the lifting force urges the second blade assembly along the ramp from a stowed configuration to a deployed configuration.

14. The hub assembly of claim 8, wherein the first biasing mechanism is a spring or a mechanical actuator.

15. The hub assembly of claim 8, wherein the rotary guide is employs a pin and slot arrangement.

16. The hub assembly of claim 8, further comprising a third hub subassembly that shares the axis of rotation with the first hub subassembly and second hub subassembly, wherein the third hub subassembly is positioned between the first hub subassembly and second hub subassembly.

17. A hub assembly comprising:
a first hub subassembly configured to rotate a first blade assembly about an axis of rotation in a first plane;
a second hub subassembly configured to rotate a second blade assembly about the axis of rotation in a second plane;
a third hub subassembly configured to rotate a third blade assembly about the axis of rotation in a third plane; and
a first rotary guide configured to control an axial position of the third hub subassembly relative to the first hub subassembly about the axis of rotation configured to be driven with a lifting force generated by the second blade assembly or the third blade assembly;
a second rotary guide configured to control an axial position of the second hub subassembly relative to the third hub subassembly about the axis of rotation as a function of the lifting force;
a first biasing mechanism that is configured to bias both the second hub subassembly and the third hub subassembly toward the first hub subassembly via a restoring force; and
a second biasing mechanism configured to bias the second hub subassembly and the third hub subassembly in a direction that opposes the bias of the first biasing mechanism.

18. The hub assembly of claim 17, wherein each of the first rotary guide and the second rotary guide comprises a first guide segment, a second guide segment, and a third guide segment that is positioned between the first guide segment and the second guide segment.

19. The hub assembly of claim 17, wherein the second biasing mechanism is a mechanical actuator.

20. The hub assembly of claim 17, wherein the first biasing mechanism is a spring or a mechanical actuator.

* * * * *